United States Patent
Sakakibara et al.

(10) Patent No.: US 9,971,329 B2
(45) Date of Patent: May 15, 2018

(54) CELL CONTROL SYSTEM, MANUFACTURING SYSTEM, AND CONTROL METHOD WHICH CONTROL MANUFACTURING CELL INCLUDING PLURALITY OF MANUFACTURING MACHINES

(71) Applicant: FANUC CORPORATION, Yamanashi (JP)

(72) Inventors: Shinsuke Sakakibara, Yamanashi (JP); Hiroji Nishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 303 days.

(21) Appl. No.: 15/067,321

(22) Filed: Mar. 11, 2016

(65) Prior Publication Data

US 2017/0031335 A1 Feb. 2, 2017

(30) Foreign Application Priority Data

Jul. 31, 2015 (JP) ................................. 2015-152888
Nov. 30, 2015 (JP) ................................. 2015-233477

(51) Int. Cl.
*G05B 19/042* (2006.01)
*G05B 15/02* (2006.01)
(Continued)

(52) U.S. Cl.
CPC ........... *G05B 19/042* (2013.01); *G05B 15/02* (2013.01); *G05B 19/048* (2013.01);
(Continued)

(58) Field of Classification Search
None
See application file for complete search history.

(56) References Cited

U.S. PATENT DOCUMENTS 8,620,618 B2 * 12/2013 Eryurek ................. G05B 15/02
700/95
2009/0210081 A1 * 8/2009 Sustaeta ............. G05B 13/0285
700/99

(Continued)

FOREIGN PATENT DOCUMENTS

CN 103176440 6/2013
CN 103699076 A 4/2014

(Continued)

OTHER PUBLICATIONS

English Abstract for Japanese Publication No. 10320011 A, published Dec. 4, 1998, 1 pg.

(Continued)

*Primary Examiner* — Benjamin Sandvik
(74) *Attorney, Agent, or Firm* — Fredrickson & Byron, P.A.

(57) ABSTRACT

A cell control system including a communication device for communicating with a manufacturing cell including a plurality of manufacturing machines configured to manufacture a product, an obtaining module for obtaining first manufacturing information in a manufacturing cell unit associated with the manufacture of the product, a first generation module for generating a plurality of pieces of second manufacturing information for the plurality of manufacturing machines, based on the first manufacturing information, a transmission module for transmitting the plurality of pieces of second manufacturing information to the plurality of manufacturing machines, a reception module for receiving manufacturing machine-specific, third manufacturing information corresponding to the second manufacturing information from the plurality of manufacturing machines, a second generation module for generating fourth manufacturing information in the manufacturing cell unit, based on the third manufacturing information from the plurality of manufac- (Continued)

turing machines, and an output module for outputting the fourth manufacturing information.

15 Claims, 22 Drawing Sheets

(51) Int. Cl.
  *G05B 19/048* (2006.01)
  *G05B 19/418* (2006.01)
(52) U.S. Cl.
  CPC ... *G05B 19/4185* (2013.01); *G05B 19/41865* (2013.01); *G05B 2219/32079* (2013.01); *Y02P 90/18* (2015.11); *Y02P 90/20* (2015.11)

(56) References Cited

U.S. PATENT DOCUMENTS

| | | | | |
|---|---|---|---|---|
| 2010/0249968 | A1* | 9/2010 | Neuber | G06Q 10/06 700/99 |
| 2017/0343994 | A1* | 11/2017 | Nishi | G05B 19/41865 |

FOREIGN PATENT DOCUMENTS

| | | |
|---|---|---|
| CN | 104220943 A | 12/2014 |
| CN | 104503362 A | 4/2015 |
| JP | 5927311 A | 2/1984 |
| JP | 6158009 A | 3/1986 |
| JP | 1106905 U | 7/1989 |
| JP | 540507 A | 2/1993 |
| JP | 10320011 A | 12/1998 |
| JP | 200462276 A | 2/2004 |
| JP | 2010287131 A | 12/2010 |
| WO | 2007105298 A1 | 9/2007 |

OTHER PUBLICATIONS

English Abstract and Machine Translation for Japanese Publication No. 2010-287131 A, published Dec. 24, 2010, 17 pgs.
English Abstract and Machine Translation for Japanese Publication No. 05-040507 A, published Feb. 19, 1993, 10 pgs.
English Abstract and Machine Translation for Japanese Publication No. 1-106905 U1, published Jul. 19, 1989, 4 pgs.
English Abstract for Japanese Publication No. 61-059009 A, published Mar. 25, 1986, 1 pg.
English Abstract and Machine Translation for Japanese Publication No. 59-027311 A, published Feb. 13, 1984, 7 pgs.
Untranslated Decision to Grant a Patent mailed by Japan Patent Office (JPO) for Application No. JP 2015-233477, dated Jun. 13, 2017, 3 pages.
English machine translation of Decision to Grant a Patent mailed by Japan Patent Office (JPO) for Application No. JP 2015-233477, dated Jun. 13, 2017, 3 pages.
Untranslated Notification of Reasons for Refusal mailed by Japan Patent Office (JPO) for Application No. JP 2015-233477, dated Jan. 24, 2017, 2 pages.
English machine translation of Notification of Reasons for Refusal mailed by Japan Patent Office (JPO) for Application No. JP 2015-233477, dated Jan. 24, 2017, 2 pages.
Untranslated Notification of Reasons for Refusal mailed by Japan Patent Office (JPO) for Application No. JP 2015-233477, dated Jun. 28, 2016, 7 pages.
English machine translation of Notification of Reasons for Refusal mailed by Japan Patent Office (JPO) for Application No. JP 2015-233477, dated Jun. 28, 2016, 6 pages.
English Abstract for Japanese Publication No. 2004-062276 A, published Feb. 26, 2004, 1 pg.
English Abstract for Chinese Publication No. 104503362 A, published Apr. 8, 2015, 1 pg.
English Abstract for Chinese Publication No. 104220943 A, published Dec. 17, 2014, 1 pg.
English Abstract and Machine Translation for Chinese Publication No. 103699076 A, published Apr. 2, 2014, 7 pgs.
English Abstract for Chinese Publication No. 103176440 A, published Jun. 26, 2013, 1 pg.

* cited by examiner

FIG. 3A

| CELL ID | CELL NAME | MANUFACTURING MACHINE | ... |
|---|---|---|---|
| C001 | CELL A | PROCESSING MACHINE C1 & ROBOT R1 | ... |
| C002 | CELL A | PROCESSING MACHINE C3 & ROBOT R2 | ... |
| C003 | CELL A | PROCESSING MACHINE C3 & ROBOT R3 | ... |
| C101 | CELL B | PROCESSING MACHINE C2 & ROBOT R2 | ... |
| C201 | CELL C | PROCESSING MACHINE C1 & ROBOT R2 | ... |
| ... | ... | ... | ... |

FIG. 3B

| MANUFACTURING MACHINE ID | MANUFACTURING MACHINE NAME | STATE | ... |
|---|---|---|---|
| M001 | PROCESSING MACHINE C1 | ON STANDBY | ... |
| M002 | PROCESSING MACHINE C2 | IN ACTION | ... |
| M003 | PROCESSING MACHINE C3 | ON STANDBY | ... |
| M004 | ROBOT R1 | ON STANDBY | ... |
| M005 | ROBOT R2 | ON STANDBY | ... |
| M006 | ROBOT R3 | MAINTAINED | ... |
| ... | ... | ... | ... |

FIG. 3C

| MANUFACTURING MACHINE ID | MANUFACTURING MACHINE NAME | PRODUCT NAME | PROGRAM DATA | PARAMETER DATA | ... |
|---|---|---|---|---|---|
| M001 | PROCESSING MACHINE C1 | PRODUCT a | P1 | D1 | ... |
| M001 | PROCESSING MACHINE C1 | PRODUCT c | P2 | D2 | ... |
| M002 | PROCESSING MACHINE C2 | PRODUCT b | P3 | D3 | ... |
| M003 | PROCESSING MACHINE C3 | PRODUCT a | P4 | D4 | ... |
| M004 | ROBOT R1 | PRODUCT a | P5 | D5 | ... |
| M005 | ROBOT R2 | PRODUCT a | P6 | D6 | |
| M005 | ROBOT R2 | PRODUCT b | P7 | D7 | ... |
| M005 | ROBOT R2 | PRODUCT c | P8 | D8 | ... |
| M006 | ROBOT R3 | PRODUCT a | P9 | D9 | ... |
| ... | ... | ... | ... | ... | ... |

FIG. 4

| MANAGEMENT NUMBER | CELL NAME | PRODUCT NAME | MANUFACTURING MACHINE NAME | PROGRAM DATA | PARAMETER DATA | STATE | AVERAGE CURRENT VALUE | TOTAL PROCESSING TIME | AVERAGE AMBIENT TEMPERATURE | PRODUCT SIZE |
|---|---|---|---|---|---|---|---|---|---|---|
| 1 | CELL A | PRODUCT a | PROCESSING MACHINE C1 & ROBOT R1 | P1,P5 | D1,D5 | COMPLETE | 100 A: GOOD | 50 SEC: GOOD | 34°C: GOOD | 100.5mm |
| 2 | CELL A | PRODUCT a | PROCESSING MACHINE C1 & ROBOT R1 | P1,P5 | D1,D5 | STARTED | — | — | — | — |
| 3 | CELL A | PRODUCT a | PROCESSING MACHINE C3 & ROBOT R2 | P4,P6 | D4,D6 | COMPLETE | 120 A: GOOD | 45 SEC: GOOD | 33°C: GOOD | 100.2mm |
| 4 | CELL A | PRODUCT a | PROCESSING MACHINE C3 & ROBOT R2 | P4,P6 | D4,D6 | STARTED | — | — | — | — |
| 5 | CELL A | PRODUCT a | PROCESSING MACHINE C3 & ROBOT R2 | P4,P6 | D4,D6 | ON STANDBY | — | — | — | — |
| ⋮ | ⋮ | ⋮ | ⋮ | ⋮ | ⋮ | ⋮ | ⋮ | ⋮ | ⋮ | ⋮ |

FIG. 6A

| CELL NAME | PRODUCT NAME | PROCESS NUMBER | CELL NAME IN NEXT PROCESS | NUMBER OF PRODUCTS | APPOINTED DATE OF DELIVERY | LEVEL OF PRIORITY |
|---|---|---|---|---|---|---|

FIG. 6B

| MANUFACTURING MACHINE NAME | PRODUCT NAME | PROGRAM DATA | PARAMETER DATA |
|---|---|---|---|

FIG. 6C

| MANUFACTURING MACHINE NAME | PRODUCT NAME | CURRENT VALUE | PROCESSING TIME | AMBIENT TEMPERATURE | PRODUCT SIZE |
|---|---|---|---|---|---|

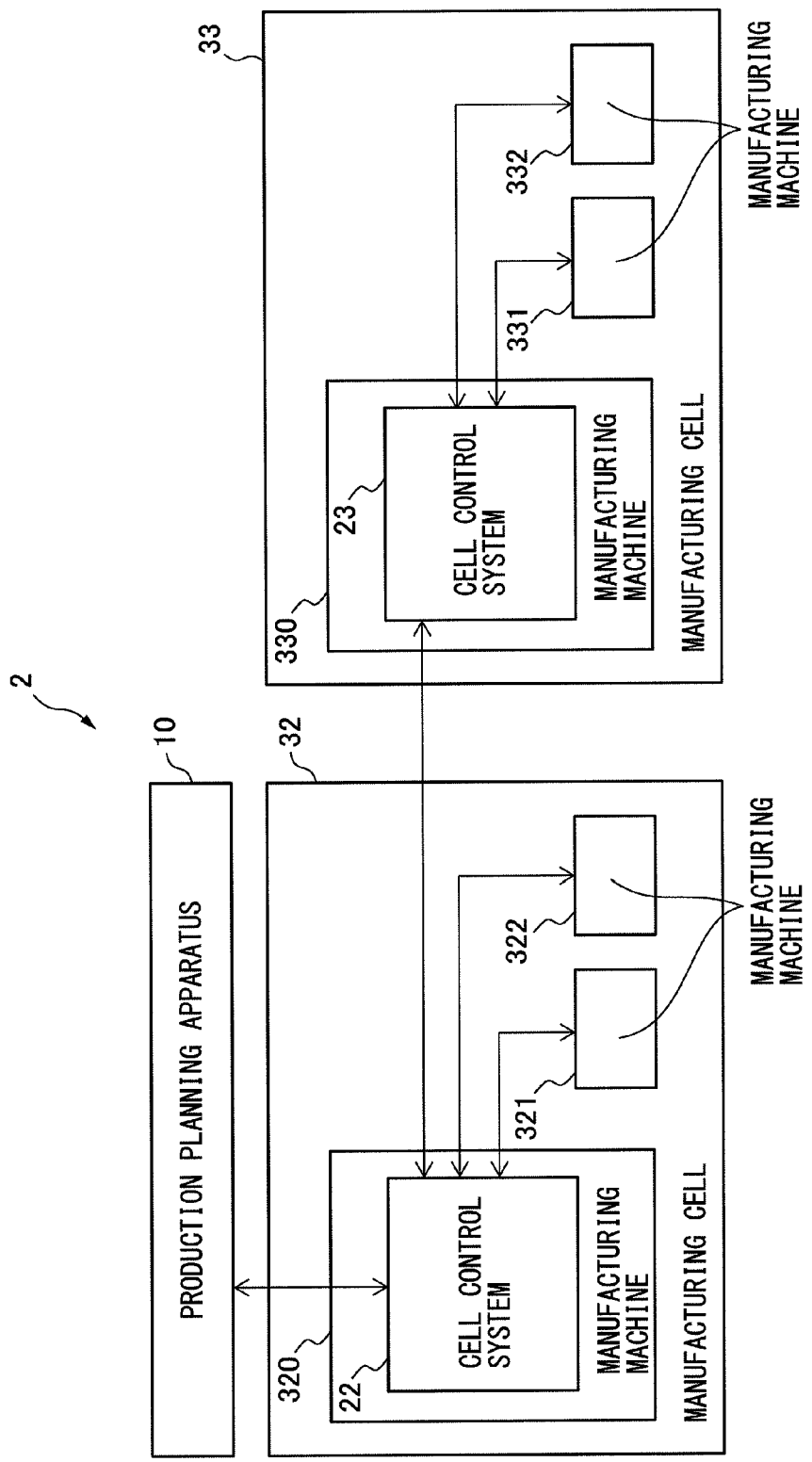

CELL CONTROL SYSTEM, MANUFACTURING SYSTEM, AND CONTROL METHOD WHICH CONTROL MANUFACTURING CELL INCLUDING PLURALITY OF MANUFACTURING MACHINES

BACKGROUND OF THE INVENTION

1. Field of the Invention

The present invention relates to a cell control system, a manufacturing system, and a control method which control a manufacturing cell including a plurality of manufacturing machines.

2. Description of the Related Art

In a conventional manufacturing or production system, a host computer which performs production or manufacturing planning executes enterprise resource planning and supply chain management and a manufacturing execution system plans, for example, products to be manufactured, the numbers of products, the appointed dates of delivery, manufacturing machines used, and manufacturing plants. In other words, an operator in the manufacturing site operates manufacturing apparatuses to manufacture products based on a production plan devised by the host computer. Further, the operator in the manufacturing site sends, for example, the operation information of the manufacturing apparatuses and the manufacturing performance of products to execute, for example, quality management and process management.

As described in, for example, PCT International Publication No. WO 2007/105298, one method generates process information using a product object and an operation object and, in turn, generates allocation information from the process information and a resource object.

As described in, for example, Japanese Laid-open Patent Publication No. 2004-62276, another method periodically collects the device information of a machine tool or a measuring device at preset periods, accumulates or stores the collected device information in a database in association with the collection times of day, and sends the accumulated information to an external device.

SUMMARY OF INVENTION

Recently, to keep pace with diversified market needs, shortened product life cycles, and intensified competition in global markets, the number of product models and the fluctuation in volume of sales are increasing. It is, therefore, preferable to cope with variable model, variable volume production so as to manufacture products dynamically in response to demands on the markets.

A flexible cellular manufacturing or production system is available, in which a plurality of manufacturing machines are combined into a single manufacturing cell for manufacture that uses a manufacturing cell unit for each process. The flexible cellular manufacturing system is capable of manufacturing a plurality of product models using only one manufacturing cell, and may even be equipped with manufacturing cells which are changed in number in accordance with the volume of production or manufacture and have their internal configuration changed in response to a change in product model to be manufactured.

However, since the flexible cellular manufacturing system involves frequent interchange or replacement of manufacturing machines in each manufacturing cell and frequent addition and removal of manufacturing cells, it is preferable to change the manufacturing execution system of the host computer accordingly and devise a production or manufacturing plan again. Further, in the flexible cellular manufacturing system, since a plurality of product models are manufactured by only one manufacturing cell and the product models to be manufactured are frequently changed, an operator in the manufacturing site preferably performs frequent changeover or retooling operations involved. Therefore, the flexible cellular manufacturing system preferably involves efficient, error-free control of the manufacturing cells. This increases the burden on the operator or programmer to efficiently control the manufacturing cell without any errors. For example, information defined in a manufacturing cell unit for control and representing the manufacturing state in which a plurality of manufacturing machines manufacture a plurality of products generally has a very large volume. It is, therefore, difficult to determine the type of information suitable for representing a feature of the manufacturing state and the type of process to be desirably performed to compress information.

In the flexible cellular manufacturing system, since the same type of product is manufactured in a plurality of manufacturing cells or the manufacturing machines used are frequently interchanged or replaced, separate analysis of the operation information and manufacturing performance of each individual manufacturing machine is insufficient for appropriate quality management and process management. Even if, e.g., a method for efficiently controlling the manufacturing cell is determined, the determined control method becomes inefficient when the type of product, the specifications, the number of products to be manufactured, the appointed date of delivery, or the like has varied more than expected. Changing the control method in response to each such variation only increases the burden on the operator or programmer.

In view of this, it is an exemplary object to provide a cell control system, a manufacturing system, a control method, and a non-transitory medium which allow efficient, error-free control of a manufacturing cell including a plurality of manufacturing machines.

It is another exemplary object to provide a cell control system, a manufacturing system, a control method, and a non-transitory medium which allow appropriate quality management and process management when a manufacturing cell including a plurality of manufacturing machines is used.

In an aspect, there is provided a cell control system including a communication device, an obtaining module, a first generation module, a transmission module, a reception module, a second generation module, and an output module. The communication device communicates with a manufacturing cell including a plurality of manufacturing machines configured to manufacture a product. The obtaining module obtains first manufacturing information defined in a manufacturing cell unit associated with the manufacture of the product. The first generation module generates a plurality of pieces of second manufacturing information for the plurality of manufacturing machines, respectively, based on the first manufacturing information. The transmission module transmits the plurality of pieces of second manufacturing information to the plurality of manufacturing machines, respectively, via the communication device. The reception module receives manufacturing machine-specific, third manufacturing information corresponding to the second manufacturing information from each of the plurality of manufacturing machines via the communication device. The second generation module generates fourth manufacturing information defined in the manufacturing cell unit, based on the third manufacturing information from each of the plurality of manufacturing machines. The output module outputs the fourth manufacturing information.

Each manufacturing machine may include a processing machine, a robot, a PLC, a conveyor, a measuring device, a tester, a press machine, a press fitting machine, a printing press, a die-casting machine, an injection-molding machine, a food machine, a packaging machine, a welding machine, a cleaning machine, a coating machine, an assembling device, a mounting machine, a woodworking machine, a sealing device, or a cutter.

The first manufacturing information may be production planning information representing a production plan of the product defined in a manufacturing cell unit, and the second manufacturing information may be manufacturing instruction information representing a manufacturing instruction of the product defined in a manufacturing machine unit.

The third manufacturing information may be manufacturing performance information representing manufacturing performance of the product defined in a manufacturing machine unit, and the fourth manufacturing information may be manufacturing performance information representing manufacturing performance of the product defined in a manufacturing cell unit.

The cell control system may include at least one cell control apparatus.

The communication device may further communicate with a production planning apparatus which plans the manufacture of the product, the obtaining module may obtain the first manufacturing information by receiving the first manufacturing information from the production planning apparatus via the communication device, and the output module may output the fourth manufacturing information by transmitting the fourth manufacturing information to the production planning apparatus via the communication device.

The communication device may further communicate with a second cell control system different from the cell control system, the obtaining module may further receive, from the production planning apparatus, fifth manufacturing information defined in a manufacturing cell unit associated with the manufacture of the product and corresponds to a second manufacturing cell which communicates with the second cell control system, the transmission module may further transmit the fifth manufacturing information to the second cell control system via the communication device, the reception module may further receive, from the second cell control system via the communication device, sixth manufacturing information defined in the manufacturing cell unit by the second manufacturing cell and generated based on the fifth manufacturing information, and the output module may further transmit the sixth manufacturing information to the production planning apparatus.

In another aspect, there is provided a manufacturing system including the above-mentioned cell control system, and the manufacturing cell.

In still another aspect, there is provided a manufacturing system including the above-mentioned cell control system, the manufacturing cell, the second cell control system, and the second manufacturing cell. The second cell control system includes a second communication device, a second obtaining module, a third generation module, a second transmission module, a second reception module, a fourth generation module, and a second output module. The second communication device communicates with the second manufacturing cell and the cell control system. The second obtaining module receives the fifth manufacturing information from the cell control system via the second communication device. The third generation module generates a plurality of pieces of seventh manufacturing information for a plurality of manufacturing machines, respectively, of the second manufacturing cell, based on the fifth manufacturing information. The second transmission module transmits the plurality of pieces of seventh manufacturing information to the plurality of manufacturing machines, respectively, of the second manufacturing cell via the second communication device. The second reception module receives manufacturing machine-specific, eighth manufacturing information corresponding to the seventh manufacturing information from each of the plurality of manufacturing machines of the second manufacturing cell via the second communication device. The fourth generation module generates the sixth manufacturing information based on the eighth manufacturing information from each of the plurality of manufacturing machines of the second manufacturing cell. The second output module transmits the fifth manufacturing information to the cell control system.

In still another aspect, there is provided a cell control system mounted in a first manufacturing machine of a manufacturing cell including a plurality of manufacturing machines configured to manufacture a product. The cell control system includes a communication device, an obtaining module, a first generation module, a transmission module, a machine control module, a reception module, a second generation module, and an output module. The communication device communicates with a second manufacturing machine other than the first manufacturing machine in the manufacturing cell. The obtaining module obtains first manufacturing information defined in a manufacturing cell unit associated with the manufacture of the product. The first generation module generates manufacturing machine-specific, second manufacturing information corresponding to the first manufacturing machine, and manufacturing machine-specific, third manufacturing information corresponding to the second manufacturing machine, based on the first manufacturing information. The transmission module transmits the third manufacturing information to the second manufacturing machine via the communication device. The machine control module controls the first manufacturing machine based on the second manufacturing information and generates manufacturing machine-specific, fourth manufacturing information corresponding to the second manufacturing information. The reception module receives manufacturing machine-specific, fifth manufacturing information corresponding to the third manufacturing information from the second manufacturing machine via the communication device. The second generation module generates sixth manufacturing information defined in the manufacturing cell unit, based on the fourth manufacturing information and the fifth manufacturing information. The output module outputs the sixth manufacturing information.

In still another aspect, there is provided a cell control system mounted in a first manufacturing machine of a manufacturing cell including a plurality of manufacturing machines configured to manufacture a product. The cell control system includes a communication device, an obtaining module, a transmission module, a first generation module, a machine control module, a reception module, a second generation module, and an output module. The communication device communicates with a second cell control system, other than the cell control system, mounted in a second manufacturing machine other than the first manufacturing machine in the manufacturing cell. The obtaining module obtains first manufacturing information defined in a manufacturing cell unit associated with the manufacture of the product. The transmission module transmits the first manufacturing information to the second cell control system via the communication device. The first generation module generates manufacturing machine-specific, second manufacturing information corresponding to the first manufacturing machine, based on the first manufacturing information. The machine control module controls the first manufacturing machine based on the second manufacturing information and generates manufacturing machine-specific, third manufacturing information corresponding to the second manufacturing information. The reception module receives, from the second cell control system via the communication device, fourth manufacturing information defined in a manufacturing cell unit and generated based on the first manufacturing information. The second generation module generates fifth manufacturing information defined in the manufacturing cell unit, based on the third manufacturing information and the fourth manufacturing information. The output module outputs the fifth manufacturing information.

The communication device may further communicate with a production planning apparatus which plans the manufacture of the product, the obtaining module may obtain the first manufacturing information by receiving the first manufacturing information from the production planning apparatus via the communication device, and the output module may output the fifth manufacturing information by transmitting the fifth manufacturing information to the production planning apparatus via the communication device.

The cell control system may include at least one cell control apparatus.

In still another aspect, there is provided a manufacturing system including a manufacturing cell including a plurality of manufacturing machines including the first manufacturing machine equipped with the above-mentioned cell control system.

In still another aspect, there is provided a manufacturing system including a manufacturing cell including a plurality of manufacturing machines including the first manufacturing machine equipped with the above-mentioned cell control system. The second cell control system includes a second communication device, a second obtaining module, a third generation module, a second machine control module, a fourth generation module, and a second output module. The second communication device communicates with the cell control system. The second obtaining module receives the first manufacturing information from the cell control system via the second communication device. The third generation module generates manufacturing machine-specific, sixth manufacturing information corresponding to the second manufacturing machine, based on the first manufacturing information. The second machine control module controls the second manufacturing machine based on the sixth manufacturing information and generates manufacturing machine-specific, seventh manufacturing information corresponding to the second manufacturing machine. The fourth generation module generates the fourth manufacturing information based on the seventh manufacturing information. The second output module transmits the fourth manufacturing information to the cell control system via the second communication device.

The manufacturing system may further include a second manufacturing cell which is different from the manufacturing cell and includes a plurality of manufacturing machines including a third manufacturing machine equipped with a third cell control system different from the cell control system and the second cell control system. The manufacturing system may include a third communication device, a third obtaining module, a fifth generation module, a third machine control module, a sixth generation module, and a third output module. The third communication device may communicate with the second manufacturing cell and the cell control system or the second cell control system. The third obtaining module may receive, from the cell control system or the second cell control system via the third communication device, eighth manufacturing information defined in a manufacturing cell unit associated with the manufacture of the product and corresponds to the second manufacturing cell. The fifth generation module may generate manufacturing machine-specific, ninth manufacturing information corresponding to the third manufacturing machine, based on the eighth manufacturing information. The third machine control module may control the third manufacturing machine based on the ninth manufacturing information and generates manufacturing machine-specific, 10th manufacturing information corresponding to the third manufacturing machine. The sixth generation module may generate, based on the 10th manufacturing information, 11th manufacturing information defined in the manufacturing cell unit defined by the second manufacturing cell. The third output module may transmit the 11th manufacturing information to the cell control system or the second cell control system via the third communication device.

In still another aspect, there is provided a method for controlling a cell control system including a communication device which communicates with a manufacturing cell including a plurality of manufacturing machines configured to manufacture a product. The method includes obtaining first manufacturing information defined in a manufacturing cell unit associated with the manufacture of the product, generating a plurality of pieces of second manufacturing information for the plurality of manufacturing machines, respectively, based on the first manufacturing information, transmitting the plurality of pieces of second manufacturing information to the plurality of manufacturing machines, respectively, via the communication device, receiving manufacturing machine-specific, third manufacturing information corresponding to the second manufacturing information from each of the plurality of manufacturing machines via the communication device, generating fourth manufacturing information defined in the manufacturing cell unit, based on the third manufacturing information from each of the plurality of manufacturing machines, and outputting the fourth manufacturing information.

In still another aspect, there is provided a computer-readable, non-transitory medium storing a computer program. The computer program causes a cell control system including a communication device which communicates with a manufacturing cell comprising a plurality of manufacturing machines configured to manufacture a product to perform a process. The process including obtaining first manufacturing information defined in a manufacturing cell unit associated with the manufacture of the product, generating a plurality of pieces of second manufacturing information for the plurality of manufacturing machines, respectively, based on the first manufacturing information, transmitting the plurality of pieces of second manufacturing information to the plurality of manufacturing machines, respectively, via the communication device, receiving manufacturing machine-specific, third manufacturing information corresponding to the second manufacturing information from each of the plurality of manufacturing machines via the communication device, generating fourth manufacturing information defined in the manufacturing cell unit, based on the third manufacturing information from each of the plurality of manufacturing machines, and outputting the fourth manufacturing information.

In still another aspect, there is provided a method for controlling a cell control system mounted in a first manufacturing machine of a manufacturing cell including a plurality of manufacturing machines configured to manufacture a product. The cell control system includes a communication device which communicates with a second manufacturing machine other than the first manufacturing machine in the manufacturing cell. The method includes obtaining first manufacturing information defined in a manufacturing cell unit associated with the manufacture of the product, generating manufacturing machine-specific, second manufacturing information corresponding to the first manufacturing machine, and manufacturing machine-specific, third manufacturing information corresponding to the first manufacturing machine, based on the first manufacturing information, transmitting the third manufacturing information to the second manufacturing machine via the communication device, controlling the first manufacturing machine based on the second manufacturing information and generating manufacturing machine-specific, fourth manufacturing information corresponding to the second manufacturing information, receiving manufacturing machine-specific, fifth manufacturing information corresponding to the third manufacturing information from the second manufacturing machine via the communication device, generating sixth manufacturing information defined in the manufacturing cell unit, based on the fourth manufacturing information and the fifth manufacturing information, and outputting the sixth manufacturing information.

In still another aspect, there is provided a computer-readable, non-transitory medium storing a computer program. The computer program causes a cell control system mounted in a first manufacturing machine of a manufacturing cell including a plurality of manufacturing machines configured to manufacture a product to perform a process. The cell control system includes a communication device which communicates with a second manufacturing machine other than the first manufacturing machine in the manufacturing cell. The process including obtaining first manufacturing information defined in a manufacturing cell unit associated with the manufacture of the product, generating manufacturing machine-specific, second manufacturing information corresponding to the first manufacturing machine, and manufacturing machine-specific, third manufacturing information corresponding to the first manufacturing machine, based on the first manufacturing information, transmitting the third manufacturing information to the second manufacturing machine via the communication device, controlling the first manufacturing machine based on the second manufacturing information and generating manufacturing machine-specific, fourth manufacturing information corresponding to the second manufacturing information, receiving manufacturing machine-specific, fifth manufacturing information corresponding to the third manufacturing information from the second manufacturing machine via the communication device, generating sixth manufacturing information defined in the manufacturing cell unit, based on the fourth manufacturing information and the fifth manufacturing information, and outputting the sixth manufacturing information.

In still another aspect, there is provided a method for controlling a cell control system mounted in a first manufacturing machine of a manufacturing cell including a plurality of manufacturing machines configured to manufacture a product. The cell control system includes a communication device which communicates with a second cell control system, other than the cell control system, mounted in a second manufacturing machine other than the first manufacturing machine in the manufacturing cell. The method includes obtaining first manufacturing information defined in a manufacturing cell unit associated with the manufacture of the product, transmitting the first manufacturing information to the second cell control system via the communication device, generating manufacturing machine-specific, second manufacturing information corresponding to the first manufacturing machine, based on the first manufacturing information, controlling the first manufacturing machine based on the second manufacturing information and generating manufacturing machine-specific, third manufacturing information corresponding to the second manufacturing information, receiving, from the second cell control system via the communication device, fourth manufacturing information defined in a manufacturing cell unit and generated based on the first manufacturing information, generating fifth manufacturing information defined in the manufacturing cell unit, based on the third manufacturing information and the fourth manufacturing information, and outputting the fifth manufacturing information.

In still another aspect, there is provided a computer-readable, non-transitory medium storing a computer program. The computer program causes a cell control system mounted in a first manufacturing machine of a manufacturing cell including a plurality of manufacturing machines configured to manufacture a product to perform a process. The cell control system includes a communication device which communicates with a second cell control system, other than the cell control system, mounted in a second manufacturing machine other than the first manufacturing machine in the manufacturing cell. The process including obtaining first manufacturing information defined in a manufacturing cell unit associated with the manufacture of the product, transmitting the first manufacturing information to the second cell control system via the communication device, generating manufacturing machine-specific, second manufacturing information corresponding to the first manufacturing machine, based on the first manufacturing information, controlling the first manufacturing machine based on the second manufacturing information and generating manufacturing machine-specific, third manufacturing information corresponding to the second manufacturing information, receiving, from the second cell control system via the communication device, fourth manufacturing information defined in a manufacturing cell unit and generated based on the first manufacturing information, generating fifth manufacturing information defined in the manufacturing cell unit, based on the third manufacturing information and the fourth manufacturing information, and outputting the fifth manufacturing information.

The first generation module and the second generation module of the above-mentioned cell control system may include learning devices. The learning devices generate second manufacturing information for each of a plurality of manufacturing machines of the manufacturing cell based on first manufacturing information defined in a manufacturing cell unit and associated with the manufacture of products from the production planning apparatus, and/or generate fourth manufacturing information in a manufacturing cell unit based on third manufacturing information for each manufacturing machine corresponding to the second manufacturing information from each of the plurality of manufacturing machines. All or some of the pieces of first to fourth manufacturing information may be used and the information used as input may further be extended. A first learning device mounted in the first generation module, for example, may generate second manufacturing information using the first manufacturing information as input and use part of the third manufacturing information as input. In addition, a second learning device mounted in the second generation module may generate fourth manufacturing information using the third manufacturing information as input and use part of the first manufacturing information as input. One or both of the first learning device and the second learning device may be used.

BRIEF DESCRIPTION OF THE DRAWINGS

The present invention will be more clearly understood with reference to the accompanying drawings, in which:

FIG. 3A is a table representing an exemplary data structure of a manufacturing cell table;

FIG. 3B is a table representing an exemplary data structure of a state table;

FIG. 3C is a table representing an exemplary data structure of a manufacturing machine table;

FIG. 4 is a table representing an exemplary data structure of a manufacturing management information table;

FIG. 6A is a view illustrating an exemplary data format of production planning information;

FIG. 6B is a view illustrating an exemplary data format of manufacturing instruction information;

FIG. 6C is a view illustrating an exemplary data format of manufacturing performance information;

FIG. 7 is a block diagram illustrating an exemplary schematic configuration of a manufacturing system 2 according to a second embodiment;

DETAILED DESCRIPTION

Figure 1:
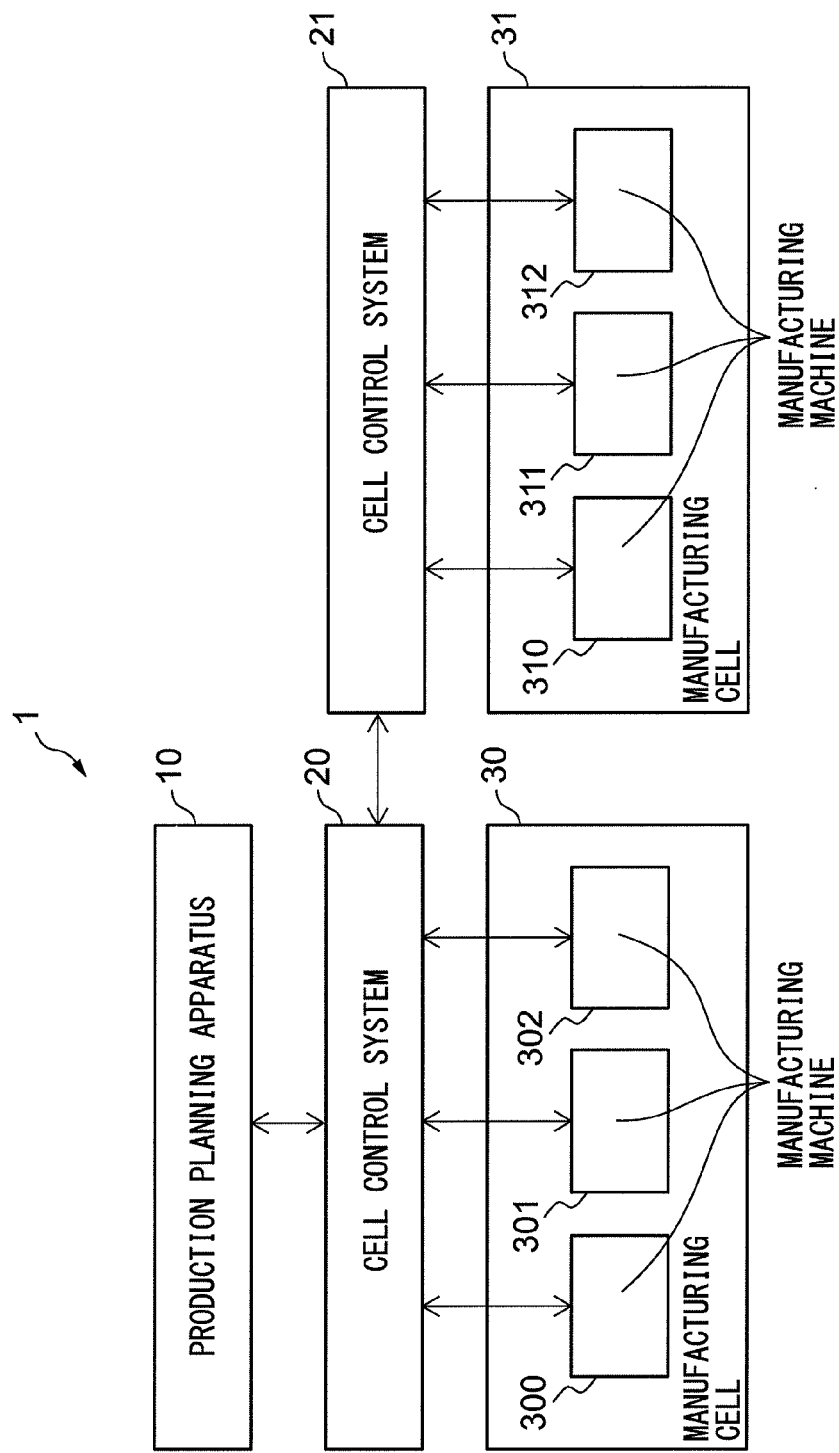
FIG. 1 is a block diagram illustrating an exemplary schematic configuration of a manufacturing system 1 according to a first embodiment.

In the following, by referring to the drawings, a motor control device having a protective unit of a charging resistor will be described. However, it is to be understood that the present invention is not limited to the drawings or embodiments illustrated below.

First Embodiment

FIG. 1 is a block diagram illustrating an exemplary schematic configuration of a manufacturing system 1 according to a first embodiment.

The manufacturing system 1 includes a production or manufacturing planning apparatus 10, a plurality of cell control systems 20 and 21, and a plurality of manufacturing cells 30 and 31. The production planning apparatus 10 is located at, for example, a base for an enterprise, and the cell control systems 20 and 21 and the manufacturing cells 30 and 31 are located at plants or other facilities for manufacturing products.

In the manufacturing system 1, the production planning apparatus 10 and the cell control system 20 are connected to each other via a network such as the Internet. Connections between the cell control systems 20 and 21, between the cell control system 20 and the manufacturing cell 30, and between the cell control system 21 and the manufacturing cell 31 are established via networks such as intranets.

The production planning apparatus 10 plans the manufacture of products and is implemented in, for example, a server or a personal computer. The production planning apparatus 10 has enterprise resource management and supply chain management functions and stores both the entire managerial resources of an enterprise and information associated with each process from the manufacture of products until sales. The production planning apparatus 10 also stores, for example, the names (manufacturing cell names) of manufacturing cells located at each manufacturing site (plant), the names (product names) of products which can be manufactured by each cell, and the number of products which can be manufactured by each cell per unit time (e.g., per day). The production planning apparatus 10 generates a production plan based on the stored, managerial resources, information associated with each process, and information associated with each manufacturing cell. The production plan includes pieces of information such as the manufacturing cell name of a manufacturing cell used, the product name, the number of products, the appointed date of delivery, and the manufacturing site (plant), for each product to be manufactured.

Each of the manufacturing cells 30 and 31 is a set of flexibly combined manufacturing machines for manufacturing products, and includes a plurality of manufacturing machines 300 to 302 or 310 to 312. Examples of the manufacturing machines include a processing machine, a robot, a PLC (Programmable Logic Controller), a conveyor, a measuring device, a tester, a press machine, a press fitting machine, a printing press, a die-casting machine, an injection-molding machine, a food machine, a packaging machine, a welding machine, a cleaning machine, a coating machine, an assembling device, a mounting machine, a woodworking machine, a sealing device, and a cutter. Each manufacturing cell may include only one manufacturing machine.

Figure 2:
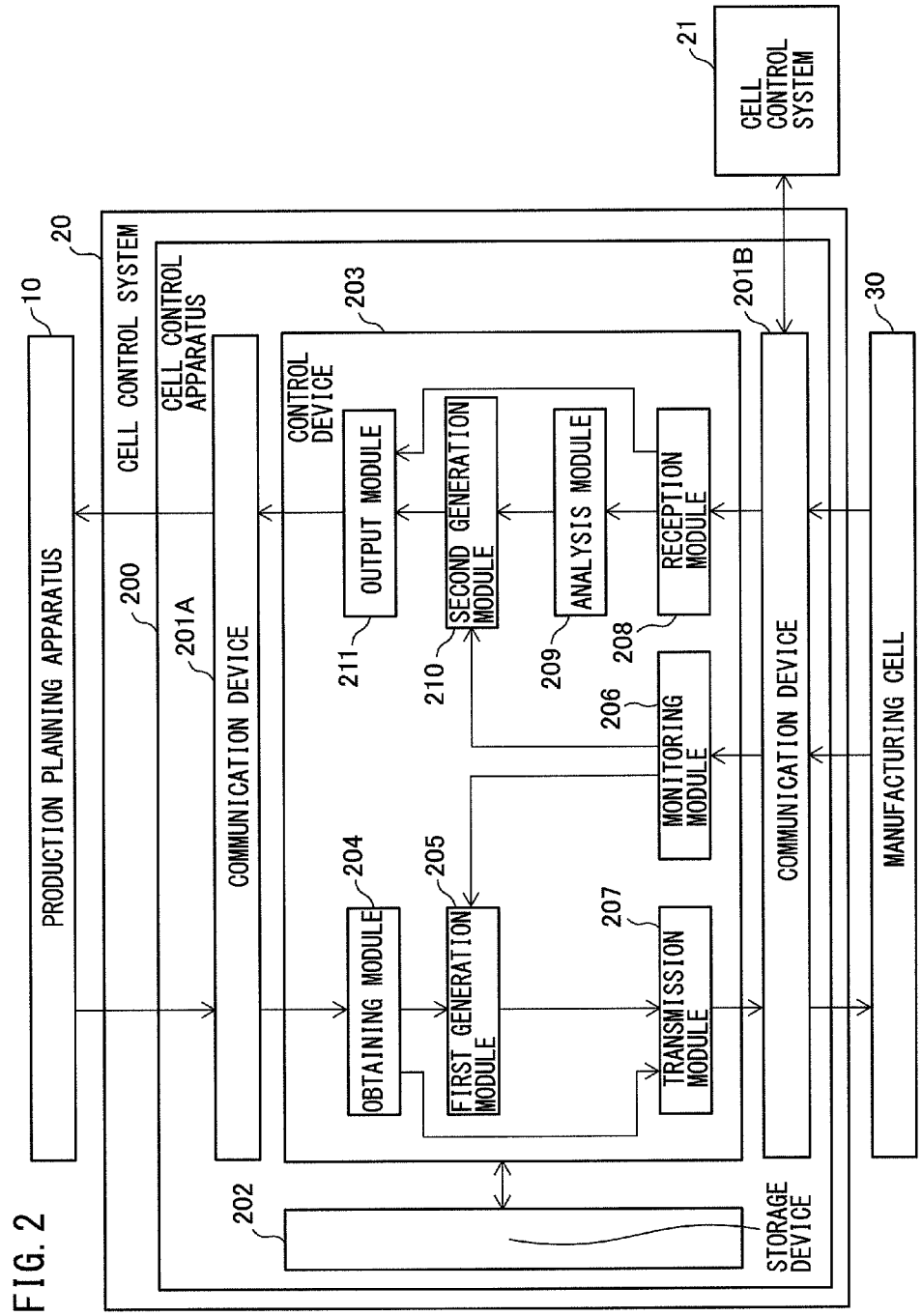
FIG. 2 is a block diagram illustrating an exemplary schematic configuration of a cell control system 20.

FIG. 2 is a block diagram illustrating an exemplary schematic configuration of the cell control system 20. Since the cell control systems 20 and 21 have the same configuration, the cell control system 20 will be described below as a representative and the differences between the cell control systems 20 and 21 will be described later.

The cell control system 20 includes a cell control apparatus 200 which controls the manufacturing cells. The cell control apparatus 200 is implemented in, for example, a server or a personal computer. The cell control apparatus 200 includes, for example, a communication device 201, a storage device 202, and a control device 203.

The communication device 201 includes a plurality of communication devices 201A and 201B.

The communication device 201A includes a wired communication interface circuit such as Ethernet (registered trademark), and communicates with, for example, the production planning apparatus 10 via a communication network such as the Internet. The communication device 201A transmits data received from, for example, the production planning apparatus 10 to the control device 203 and transmits data received from the control device 203 to, for example, the production planning apparatus 10.

The communication device 201B includes a wired communication interface circuit such as Ethernet (registered trademark), and communicates with, for example, the manufacturing cell 30 (manufacturing machines 300 to 302) and the cell control system 21 via a communication network such as an intranet. The communication device 201B transmits data received from, for example, the manufacturing cell 30 and the cell control system 21 to the control device 203 and transmits data received from the control device 203 to, for example, the manufacturing cell 30 and the cell control system 21. Since the data handled by the communication device 201B has a volume larger than that of the data handled by the communication device 201A, the communication network connected to the communication device 201B is preferably faster than the communication network connected to the communication device 201A.

Each of the communication devices 201A and 201B may include an interface circuit conforming to a serial bus such as USB (Universal Serial Bus) and communicate with each device by electrical connection. Alternatively, each of the communication devices 201A and 201B may include a communication interface circuit including an antenna mainly having, for example, the 2.4- or 5-GHz band as a frequency sensitivity range, and communicate with each device by radio based on a radio communication scheme such as the IEEE 802.11 or IEEE 802.11u standard.

Each of the communication devices 201A and 201B may also be implemented in a single communication device. The communication device 201 may include another additional communication device so that the cell control apparatus 200 communicates with the cell control system 21 via the other communication device instead of the communication device 201B. Alternatively, the cell control apparatus 200 may communicate with the cell control system 21 via the communication device 201A instead of the communication device 201B.

The storage device 202 includes at least one of, for example, a magnetic tape drive, a magnetic disk drive, or an optical disk drive. The storage device 202 includes a memory device such as a RAM (Random Access Memory) or a ROM (Read Only Memory), a fixed disk drive such as a hard disk, or a portable storage device such as a flexible disk or an optical disk. The storage device 202 also stores, for example, computer programs, databases, and tables used for various types of processing in the cell control apparatus 200. The computer program may be installed on the storage device 202 from a computer-readable, non-transitory medium such as a compact disk read only memory (CD-ROM), a digital versatile disk read only memory (DVD-ROM), or the like by using a well-known setup program or the like.

The storage device 202 stores, for example, a manufacturing cell table represented as FIG. 3A, a state table represented as FIG. 3B, a manufacturing machine table represented as FIG. 3C, and a manufacturing management information table represented as FIG. 4, in data form. The cell control system 20 may also temporarily store temporary data associated with predetermined processing.

FIG. 3A illustrates a manufacturing cell table for managing the manufacturing cells. The manufacturing cell table stores each type of manufacturing cell in association with pieces of information such as the identification number (cell ID) and name (cell name) of each manufacturing cell and the identification information (manufacturing machine ID) or name (manufacturing machine name) of each constituent manufacturing machine. The cell name and the manufacturing machine name are determined in advance but may be changed at arbitrary timings.

FIG. 3B illustrates a state table for managing the state of each manufacturing machine. The state table stores each type of manufacturing machine in association with pieces of information such as the manufacturing machine ID, manufacturing machine name, and current state of each manufacturing machine. Examples of the current state of each manufacturing machine include "in-action," "operation-complete," "suspended," "on-standby," "alarmed," "maintained," and "OFF." In the "in-action" state, the manufacturing machine is in action. In the "operation-complete" state, the operation of the manufacturing machine is complete. In the "suspended" state, the operation of the manufacturing machine is suspended. In the "on-standby" state, the manufacturing machine is inactive. In the "alarmed" state, the manufacturing machine has an abnormality. In the "maintained" state, the manufacturing machine is currently being maintained. In the "OFF" state, the manufacturing machine is OFF.

FIG. 3C illustrates a manufacturing machine table for managing the manufacturing machines. The manufacturing machine table stores each combination of a manufacturing machine and a product in association with pieces of information such as the manufacturing machine ID, the manufacturing machine name, the product name, program data, and parameter data.

The manufacturing machine ID and the manufacturing machine name are the ID and name of a given manufacturing machine, and the product name is the name of a given product to be manufactured. The program data includes a program which is installed on the given manufacturing machine and preferably used to manufacture the given product by this manufacturing machine. The parameter data includes parameters which are set in the given manufacturing machine and preferably used to manufacture the given product by this manufacturing machine.

FIG. 4 illustrates a manufacturing management information table for managing manufacturing management information. The manufacturing management information is used to manage a state associated with the manufacture of each cell. The manufacturing management information table stores each type of manufacturing management information in association with pieces of information such as the management number, the cell ID or name, the product name, the manufacturing machine ID or name, the program data, the parameter data, the state, the average current value, the total processing time, the average ambient temperature, and the product size.

The cell ID or name is the ID or name of a given cell. The product name is the name of a product to be manufactured by the given cell. The manufacturing machine ID or name is the ID or name of each manufacturing machine provided in the given cell. The program data includes a program installed on each manufacturing machine. The parameter data includes parameters set in each manufacturing machine. The state is associated with manufacture of the given cell and includes, for example, "started," "complete," and "on-standby." The average current value is the average of currents flowing through each manufacturing machine during the manufacture. The total processing time is the total time taken for the manufacture. The average ambient temperature is the average of ambient temperatures during the manufacture. The product size is the size of the manufactured product. The average current value, the total processing time, the average ambient temperature, and the product size are written when the manufacture is complete. In addition, the average current value, the total processing time, and the average ambient temperature are stored in association with result information indicating good or poor.

Referring back to FIG. 2, the control device 203 includes one or more processors and their peripheral circuits. The control device 203 is implemented in, for example, a CPU (Central Processing Unit), an independent integrated circuit, a microprocessor, or firmware. The control device 203 is connected to the communication device 201 and the storage device 202 and controls these devices. The control device 203 performs, for example, communication control of the communication device 201 and control of the storage device 202.

The control device 203 includes, for example, an obtaining module 204, a first generation module 205, a monitoring module 206, a transmission module 207, a reception module 208, an analysis module 209, a second generation module 210, and an output module 211. These modules are implemented in functional modules by software running on the processors. These modules may be implemented in, for example, independent integrated circuits, microprocessors, or firmware.

Figure 5:
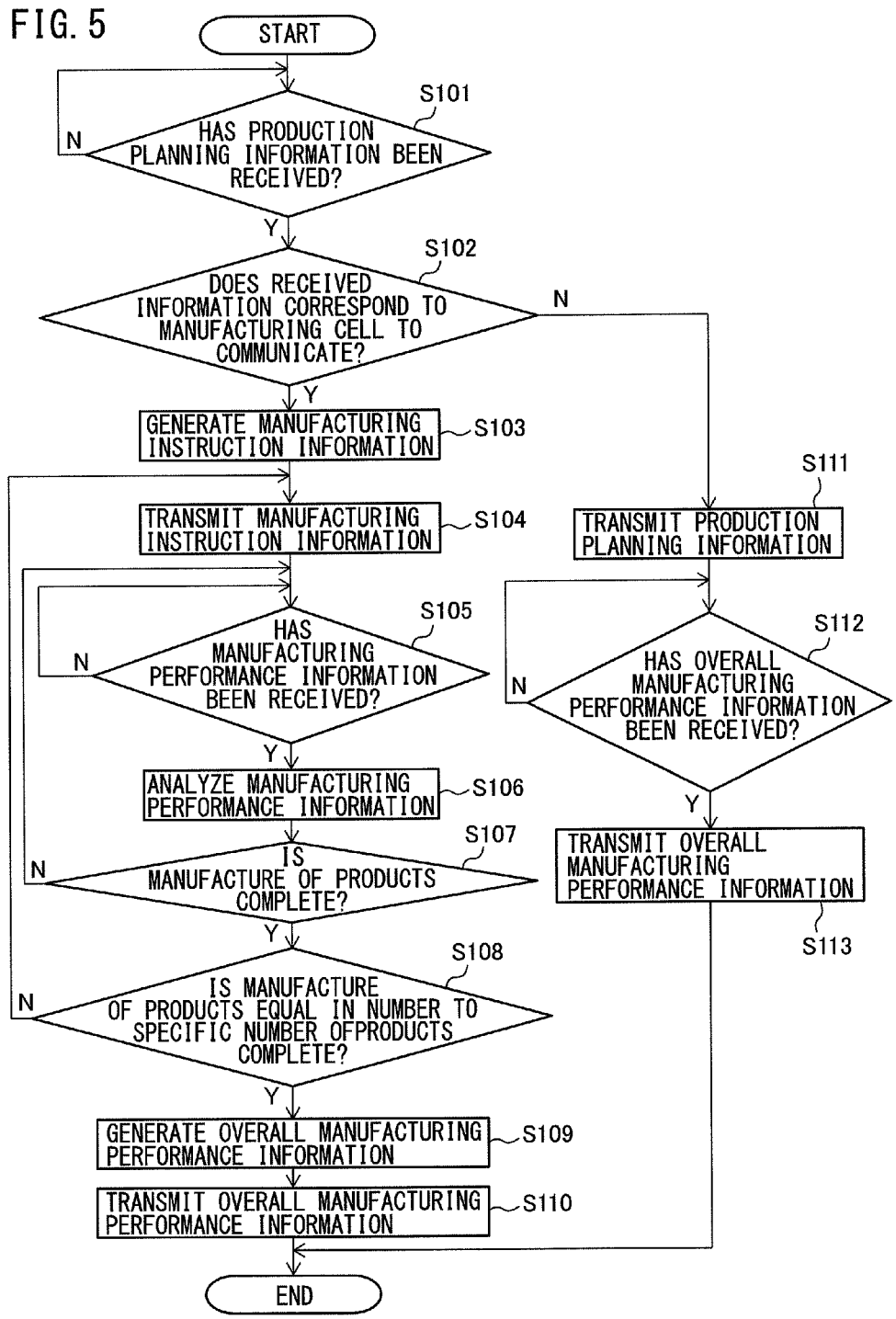
FIG. 5 is a flowchart illustrating operations for manufacturing cell control processing.

FIG. 5 is a flowchart illustrating operations for manufacturing cell control processing by the cell control system 20. The operations for manufacturing cell control processing will be described below with reference to the flowchart illustrated as FIG. 5. The following sequence of operations is executed in cooperation with each element of the cell control system 20 mainly by the control device 203 based on the program stored in the storage device 202 in advance.

First, the obtaining module 204 stands by to receive production or manufacturing planning information from the production planning apparatus 10 (step S101). The production planning information represents a production or manufacturing plan devised for products by the production planning apparatus 10 and exemplifies first manufacturing information. The first manufacturing information is associated with the manufacture of products and the production planning information and the first manufacturing information are defined in a manufacturing cell unit. The obtaining module 204 obtains production planning information by receiving the production planning information from the production planning apparatus 10 via the communication device 201A.

FIG. 6A illustrates an exemplary data format of the production planning information. Examples of the production planning information include the cell name, the product name, the process number, the cell name in the next process, the number of products, the appointed date of delivery, and the level of priority, as depicted as FIG. 6A. The cell name is the name of a given cell to be controlled. The product name is the name of a given product to be manufactured. The process number is the number of a process for manufacturing the given product, and set to 1 when a manufacturing process by the given cell is performed first and 2 when a manufacturing process by the given cell is performed second (subsequently to the process having process number 1). The cell name in the next process is the name of a cell which executes a manufacturing process subsequently to the manufacturing process by the given cell. The number of products is the number of given products to be manufactured. The appointed date of delivery is defined for the given products. The level of priority is defined for the manufacture of the given products and set as, for example, "normal" or "urgent".

Upon receiving production planning information, the obtaining module 204 determines whether the received production planning information is defined for a manufacturing cell that communicates with the cell control system 20 (step S102). The obtaining module 204 determines whether the cell name included in the production planning information is the name of a manufacturing cell that communicates with the cell control system 20 to, in turn, determine whether the production planning information is defined for a manufacturing cell that communicates with the cell control system 20.

When the production planning information is defined for a manufacturing cell that communicates with the cell control system 20, the first generation module 205 generates a plurality of pieces of manufacturing instruction information for the plurality of manufacturing machines 300 to 302, respectively, of the manufacturing cell 30 based on the production planning information (step S103). The manufacturing instruction information represents product manufacturing instructions to each manufacturing machine included in the manufacturing cell and exemplifies second manufacturing information. Examples of the manufacturing instruction information include instructions to prepare operation programs for, for example, NC (Numerical Control), a robot controller, and a PLC, instructions to prepare, for example, a jig and a robot hand, and parameters unique to products to be manufactured. The second manufacturing information is associated with the manufacture of products and the manufacturing instruction information and the second manufacturing information are defined in a manufacturing machine unit.

FIG. 6B illustrates an exemplary data format of the manufacturing instruction information. Examples of the manufacturing instruction information include the manufacturing machine name, the product name, program data, and parameter data, as depicted as FIG. 6S. The manufacturing machine name is the name of a given manufacturing machine to be controlled. The product name is the name of a product to be manufactured. The program data includes a program installed on the given manufacturing machine. The parameter data includes parameters set in the given manufacturing machine.

The first generation module 205 reads the manufacturing cell table illustrated as FIG. 3A to extract respective manufacturing machines of each cell having the cell name included in the production planning information. The first generation module 205 also reads the state table illustrated as FIG. 3B to specify the current state of each extracted manufacturing machine. The monitoring module 206 periodically receives the state of each manufacturing machine from this manufacturing machine via the communication device 201B and updates the current state of this manufacturing machine in the state table to the received state. The first generation module 205 may make the monitoring module 206 obtain the state of each manufacturing machine in real time, instead of specifying the current state of this manufacturing machine from the state table. In this case, the first generation module 205 can more accurately specify the state of each manufacturing machine.

The first generation module 205 determines a manufacturing machine used to manufacture each of products equal in number to the number of products included in the production planning information. The first generation module 205 also determines a manufacturing machine used to manufacture a product, in accordance with the current state of each manufacturing machine. When a plurality of manufacturing machines are available, the first generation module 205 may preferentially select a manufacturing machine having the highest manufacturing speed or a manufacturing machine having the lowest rate of rejection of past manufactured products. In this case, the cell control apparatus 200 stores in the storage device 202 in advance for each manufacturing machine, the manufacturing speed and the rate of rejection of past manufactured products.

The first generation module 205 reads the manufacturing machine table illustrated as FIG. 3C and determines programs to be installed and parameters to be set to manufacture products having the product names included in the production planning information, for each determined manufacturing machine. The first generation module 205 generates manufacturing instruction information associated with each manufacturing machine, based on each piece of determined information.

The first generation module 205 adds new items equal in number to products to be manufactured to the manufacturing management information table illustrated as FIG. 4. The first generation module 205 generates management numbers equal in number to products to be manufactured, associates each management number, the cell name and product name included in the production planning information, and the manufacturing machine name of the determined manufacturing machine, the program data, and the parameter data with each other, and stores them in the manufacturing management information table.

The transmission module 207 transmits the pieces of generated manufacturing instruction information to the manufacturing machines 300 to 302, respectively, included in the manufacturing cell 30 via the communication device 201B (step S104). Processes in steps S104 to S108 are executed for each of products equal in number to the specified number of products to be manufactured. Note, however, that when a plurality of manufacturing cells (manufacturing machines) are used, processes in steps S104 to S108 can be executed in parallel for each manufacturing cell. The second and subsequent processes are executed after completion of the immediately preceding process. The manufacturing machines 300 to 302 perform various settings based on the received manufacturing instruction information and manufacture products.

The reception module 208 stands by to receive manufacturing performance information from each of the manufacturing machines 300 to 302 included in the manufacturing cell 30, via the communication device 201B (step S105). The manufacturing performance information corresponds to the manufacturing instruction information transmitted to each manufacturing machine, is used for, for example, quality management and process management, represents the manufacturing performance of products for each manufacturing machine, and exemplifies third manufacturing information. The third manufacturing information is associated with the manufacture of products and the manufacturing performance information and the third manufacturing information are defined in a manufacturing machine unit.

FIG. 6C illustrates an exemplary data format of the manufacturing performance information. Examples of the manufacturing performance information include the manufacturing machine name, the product name, the current value, the processing time, the ambient temperature, and the product size, as depicted as FIG. 6C. The current value is the value of current flowing through a given manufacturing machine. The processing time is the manufacturing time of the given manufacturing machine. The ambient temperature is defined for the given manufacturing machine. The product size is the size of a manufactured product. The manufacturing performance information may further include, for example, the conveyance time and information associated with processing tools. The current value and the ambient temperature are time-series data of the average/maximum or minimum current values or ambient temperatures obtained at a predetermined time interval from the start of processing until the completion of processing. The product size is data of product errors in a plurality of portions of the product after the completion of processing. The processing time is a record of the time taken for each step of processing or each line of a processing program.

When the reception module 208 receives manufacturing performance information, the analysis module 209 analyzes the manufacturing state based on the received manufacturing performance information (step S106). The analysis module 209 checks, for example, a change in current value, transition of the processing time, a change in ambient temperature, and the product size to determine whether a problem has occurred in the manufacture. The analysis module 209 analyzes the manufacturing state by findings based on individual information such as the type of each manufacturing machine. The analysis module 209 analyzes the manufacturing state based on massive amounts of data occurring during the manufacture for each manufacturing machine, thus allowing accurate analysis.

The analysis module 209 determines whether the manufacture of products by the manufacturing cell is complete (step S107). The analysis module 209 reads the state table illustrated as FIG. 3B and determines whether the manufacture of products by the manufacturing cell is complete, in accordance with whether the current states of respective manufacturing machines of the manufacturing cell are "complete." The analysis module 209 may make the monitoring module 206 obtain the state of each manufacturing machine in real time, instead of specifying the current state of this manufacturing machine from the state table. In this case, the analysis module 209 can more quickly detect completion of the manufacture of products. When the manufacture of products is incomplete, the analysis module 209 returns the process to step S105 and the processes in steps S105 to S107 are repeated.

When the manufacture of products is complete, the second generation module 210 calculates, for example, the average current value, the total processing time, the average ambient temperature, and the product size included in each piece of manufacturing performance information received by the reception module 208, associates them with corresponding management numbers, and stores them in the manufacturing management information table.

The second generation module 210 determines whether the manufacture of products equal in number to the number of products included in the production planning information is complete (step S108). When the manufacture of products equal in number to the number of products included in the production planning information is incomplete, the second generation module 210 returns the process to step S104 and the processes in steps S104 to S108 are repeated.

When the manufacture of products equal in number to the number of products included in the production planning information is complete, the second generation module 210 generates overall manufacturing performance information based on the plurality of pieces of manufacturing performance information from the plurality of manufacturing machines 300 to 302 (step S109). The overall manufacturing performance information represents the manufacturing performance of products for the entire manufacturing cell and exemplifies fourth manufacturing information. Examples of the overall manufacturing performance information include the cell name, the product name, the average current value, the total processing time, the average ambient temperature, and the product size of each of products equal in number to the manufactured products, which are contained in the manufacturing management information table. The fourth manufacturing information is associated with the manufacture of products and the overall manufacturing performance information and the fourth manufacturing information are defined in a manufacturing cell unit.

The output module 211 transmits the overall manufacturing performance information to the production planning apparatus 10 (step S110) and a series of steps ends. The output module 211 outputs the overall manufacturing performance information by transmitting it to the production planning apparatus 10 via the communication device 201A.

When it is determined in step S102 that the production planning information is not defined for a manufacturing cell that communicates with the cell control system 20, the transmission module 207 transmits this production planning information to the cell control system 21 via the communication device 201B (step S111). In this case, the obtaining module 204 has received, from the production planning apparatus 10, production planning information corresponding to the manufacturing cell 31 that communicates with the cell control system 21. The production planning information exemplifies fifth manufacturing information.

The reception module 208 stands by to receive overall manufacturing performance information from the cell control system 21 via the communication device 201B (step S112). The overall manufacturing performance information is generated based on the production planning information transmitted to the cell control system 21 and exemplifies sixth manufacturing information.

When the reception module 208 receives the overall manufacturing performance information, the output module 211 transmits the overall manufacturing performance information to the production planning apparatus 10 (step S113) and a series of steps ends. The output module 211 outputs the overall manufacturing performance information by transmitting it to the production planning apparatus 10 via the communication device 201A.

The cell control system 21 operates in accordance with the flowchart illustrated as FIG. 5, like the cell control system 20. However, a communication device of the cell control system 21 communicates with the manufacturing cell 31 and the cell control system 20.

In step S101, an obtaining module of the cell control system 21 receives production planning information from the cell control system 20 via the communication device. In step S103, a first generation module of the cell control system 21 generates a plurality of pieces of manufacturing instruction information for the plurality of manufacturing machines 310 to 312, respectively, of the manufacturing cell 31. The manufacturing instruction information exemplifies seventh manufacturing information. In step S104, a transmission module of the cell control system 21 transmits the manufacturing instruction information to each of the manufacturing machines 310 to 312 of the manufacturing cell 31. In step S105, a reception module of the cell control system 21 receives manufacturing performance information from each of the manufacturing machines 310 to 312 of the manufacturing cell 31. The manufacturing performance information exemplifies eighth manufacturing information. In step S109, a second generation module of the cell control system 21 generates overall manufacturing performance information based on the manufacturing performance information from each of the manufacturing machines 310 to 312. In step S110, an output module of the cell control system 21 transmits the overall manufacturing performance information to the cell control system 20 as a transmission source of the production planning information.

Exemplary manufacturing cell control processing by the cell control system 20 will be described below with reference to tables illustrated as FIGS. 3A to 3C and 4.

For example, cell A may include a combination of processing machine C1 and robot R1, a combination of processing machine C3 and robot R2, or a combination of processing machine C3 and robot R3, as represented as FIG. 3A. Further, cell B may include a combination of processing machine C2 and robot R2, and cell C may include a combination of processing machine C1 and robot R2. In this case, for example, processing machine C1 may be included in cell A or C and robot R2 may be included in cell A, B, or C.

In this case, production planning information for instructing cell A to manufacture five products a, and production planning information for instructing cell B to manufacture five products b are transmitted. Further, the current states of processing machines C1 and C3 and robots R1 and R2 are "on-standby," the current state of processing machine C2 is "in-action," and the current state of robot R3 is "maintained," as illustrated as FIG. 3B. Processing machine C1 or C3 and robot R1, R2, or R3 are preferably used to manufacture products a by cell A, and processing machine C2 and robot R2 are preferably used to manufacture products b by cell B. However, since processing machine C2 is in action, products b may not be manufactured by cell B. Further, since robot R3 is currently being maintained, robot R3 may not be included in cell A.

In other words, only cell A including a combination of processing machine C1 and robot R1, and cell A including a combination of processing machine C3 and robot R2 are currently available. Therefore, a manufacturing management information table is generated to manufacture two products a (management numbers 1 and 2) by cell A including a combination of processing machine C1 and robot R1, and three products a (management numbers 3 through 5) by cell A including a combination of processing machine C3 and robot R2, as illustrated as FIG. 4. The number of products a manufactured by each cell A may be determined based, for example, on the manufacturing speed of each cell A and the rate of rejection of past manufactured products.

Each piece of manufacturing instruction information is generated to designate program P1 and parameter D1 for processing machine C1 which manufactures products a, and program P5 and parameter D5 for robot R1, in accordance with the manufacturing machine table represented as FIG. 3C. Similarly, each piece of manufacturing instruction information is generated to designate program P4 and parameter D4 for processing machine C3 which manufactures products a, and program P6 and parameter D6 for robot R2.

Cell A (management number 1) including a combination of processing machine C1 and robot R1, and cell A (management number 3) including a combination of processing machine C3 and robot R2 manufacture products a in parallel. The monitoring module 206 changes the state corresponding to management number 1 to "started" in the manufacturing management information table upon detecting activation of processing machine C1 and robot R1, and changes the state corresponding to management number 3 to "started" upon detecting activation of processing machine C3 and robot R2. On the other hand, the monitoring module 206 changes the state corresponding to management number 1 to "complete" upon detecting completion of the operation of processing machine C1 and robot R1, and changes the state corresponding to management number 3 to "complete" upon detecting completion of the operation of processing machine C3 and robot R2. When the manufacture of products a by cell A having management number 1 is complete, products a are subsequently manufactured by cell A having management number 2. Similarly, when the manufacture of products a by cell A having management number 3 is complete, products a are subsequently manufactured by cell A having management number 4.

As described in detail above, with operations based on the flowchart illustrated as FIG. 5, the production planning apparatus 10 can perform manufacturing-related management by handling only information defined in a manufacturing cell unit without recognizing individual manufacturing machines. Hence, the manufacturing system 1 is capable of both efficient, error-free control of the manufacturing cells and easy, appropriate execution of production planning, quality management, and process management.

Even when any product model manufactured by any manufacturing cell has changed or the number of manufacturing cells has changed, the production planning apparatus 10 can easily cope with these changes by updating only information associated with the relationship between the manufacturing cells and products to be manufactured. Similarly, even when any manufacturing machine in any manufacturing cell has changed because of, for example, a breakdown of some manufacturing machines, the production planning apparatus 10 can easily deal with these changes. In addition, the manufacturing system 1 implements a flexible configuration by, for example, manufacturing only one type of product using a plurality of manufacturing cells or manufacturing a plurality of products using only one manufacturing cell.

Second Embodiment

FIG. 7 is a block diagram illustrating an exemplary schematic configuration of a manufacturing system 2 according to a second embodiment.

The manufacturing system 2 has a configuration similar to that of the manufacturing system 1 according to the first embodiment. However, in the manufacturing system 2, a cell control system 22 is mounted in a manufacturing machine 320 of a manufacturing cell 32, and a cell control system 23 is mounted in a manufacturing machine 330 of a manufacturing cell 33.

Figure 8:
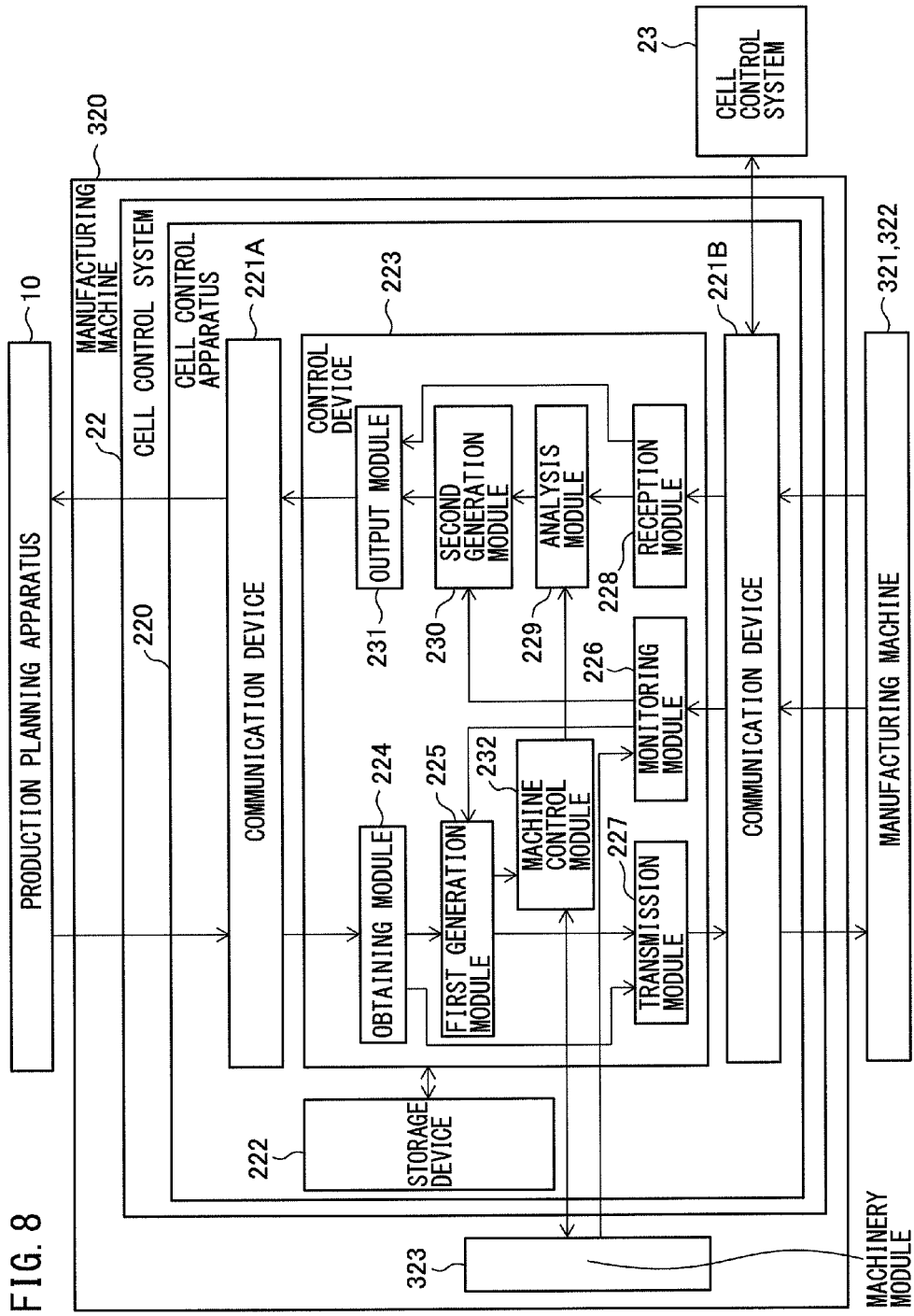
FIG. 8 is a block diagram illustrating an exemplary schematic configuration of a cell control system 22.

FIG. 8 is a block diagram illustrating an exemplary schematic configuration of the cell control system 22. Since the cell control systems 22 and 23 have the same configuration, the cell control system 22 will be described below as a representative and the differences between the cell control systems 22 and 23 will be described later.

The cell control system 22 has a configuration similar to that of the cell control system 20 according to the first embodiment. However, the cell control system 22 is mounted in the manufacturing machine 320 and connected to a machinery module 323 in the manufacturing machine 320. In addition, a communication device 221B communicates with manufacturing machines 321 and 322 other than the manufacturing machine 320 in the manufacturing cell 32. Further, a control device 223 includes a machine control module 232, in addition to each module of the control device 203 according to the first embodiment. A monitoring module 226 obtains the current state of the manufacturing machine 320 from the machinery module 323.

Figure 9:
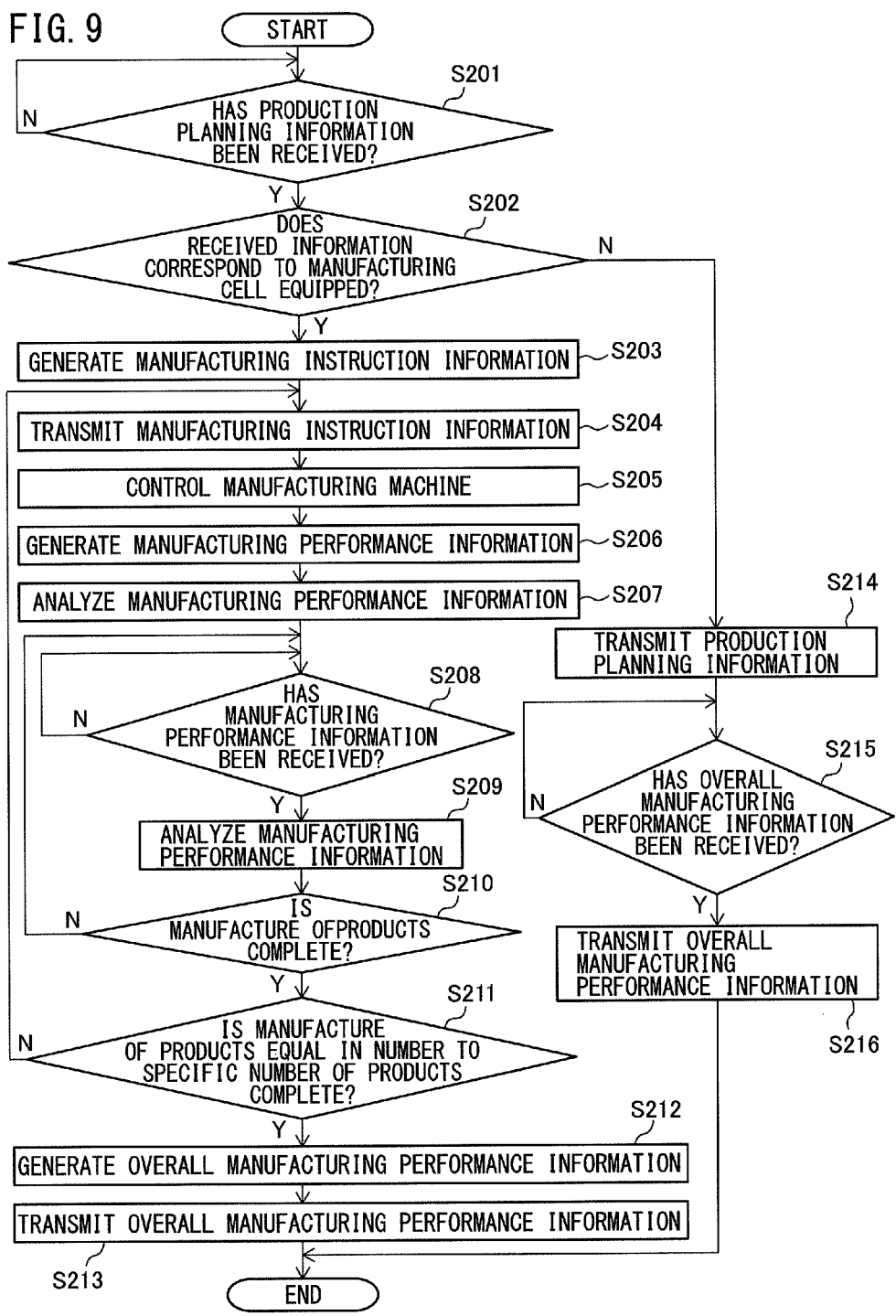
FIG. 9 is a flowchart illustrating operations for manufacturing cell control processing.

FIG. 9 is a flowchart illustrating operations for manufacturing cell control processing by the cell control system 22. The operations for manufacturing cell control processing will be described below with reference to the flowchart illustrated as FIG. 9. The following sequence of operations is executed in cooperation with each element of the cell control system 22 mainly by the control device 223 based on the program stored in a storage device 222 in advance. Further, since steps S201, S209 to S211, and S213 to S216 in the following sequence of operations are the same as steps S101, S106 to S108, and S110 to S113, respectively, illustrated as FIG. 5, a description thereof will not be given. Only steps S202 to S208 and S212 will be described hereinafter.

In step S202, an obtaining module 224 determines whether the received production planning information corresponds to a manufacturing cell equipped with the cell control system 22. The production planning information exemplifies first manufacturing information.

When the production planning information corresponds to a manufacturing cell equipped with the cell control system 22, a first generation module 225 generates manufacturing instruction information corresponding to the manufacturing machine 320 and manufacturing instruction information corresponding to each of the manufacturing machines 321 and 322, based on the production planning information (step S203). The manufacturing instruction information corresponding to the manufacturing machine 320 exemplifies second manufacturing information, and the manufacturing instruction information corresponding to each of the manufacturing machines 321 and 322 exemplifies third manufacturing information.

A transmission module 227 transmits the pieces of manufacturing instruction information corresponding to the manufacturing machines 321 and 322 to the manufacturing machines 321 and 322 via the communication device 221B (step S204).

The machine control module 232 controls the manufacturing machine 320 based on the manufacturing instruction information corresponding to the manufacturing machine 320 (step S205).

The machine control module 232 generates manufacturing performance information corresponding to the manufacturing machine 320 (step S206). The manufacturing performance information corresponds to the manufacturing instruction information corresponding to the manufacturing machine 320 and exemplifies fourth manufacturing information.

An analysis module 229 analyzes the manufacturing state based on the generated manufacturing performance information (step S207).

A reception module 228 stands by to receive manufacturing performance information from each of the manufacturing machines 321 and 322 via the communication device 221B (step S208). The manufacturing performance information corresponds to the manufacturing instruction information corresponding to each of the manufacturing machines 321 and 322 and exemplifies fifth manufacturing information.

In step S212, a second generation module 230 generates overall manufacturing performance information based on the manufacturing performance information from the manufacturing machine 320 and the manufacturing performance information from each of the manufacturing machines 321 and 322. The overall manufacturing performance information exemplifies sixth manufacturing information.

The cell control system 23 operates in accordance with the flowchart illustrated as FIG. 9, like the cell control system 22. However, a communication device of the cell control system 23 communicates with the cell control system 22 and manufacturing machines 331 and 332 of the manufacturing cell 33. In addition, in step S201, an obtaining module of the cell control system 23 receives production planning information from the cell control system 22 via the communication device. Further, in step S213, an output module of the cell control system 23 transmits overall manufacturing performance information to the cell control system 22 as a transmission source of the production planning information.

As described in detail above, with operations based on the flowchart illustrated as FIG. 9 as well, the manufacturing system 2 is capable of both efficient, error-free control of the manufacturing cells and easy, appropriate execution of production planning, quality management, and process management.

Third Embodiment

Figure 10:
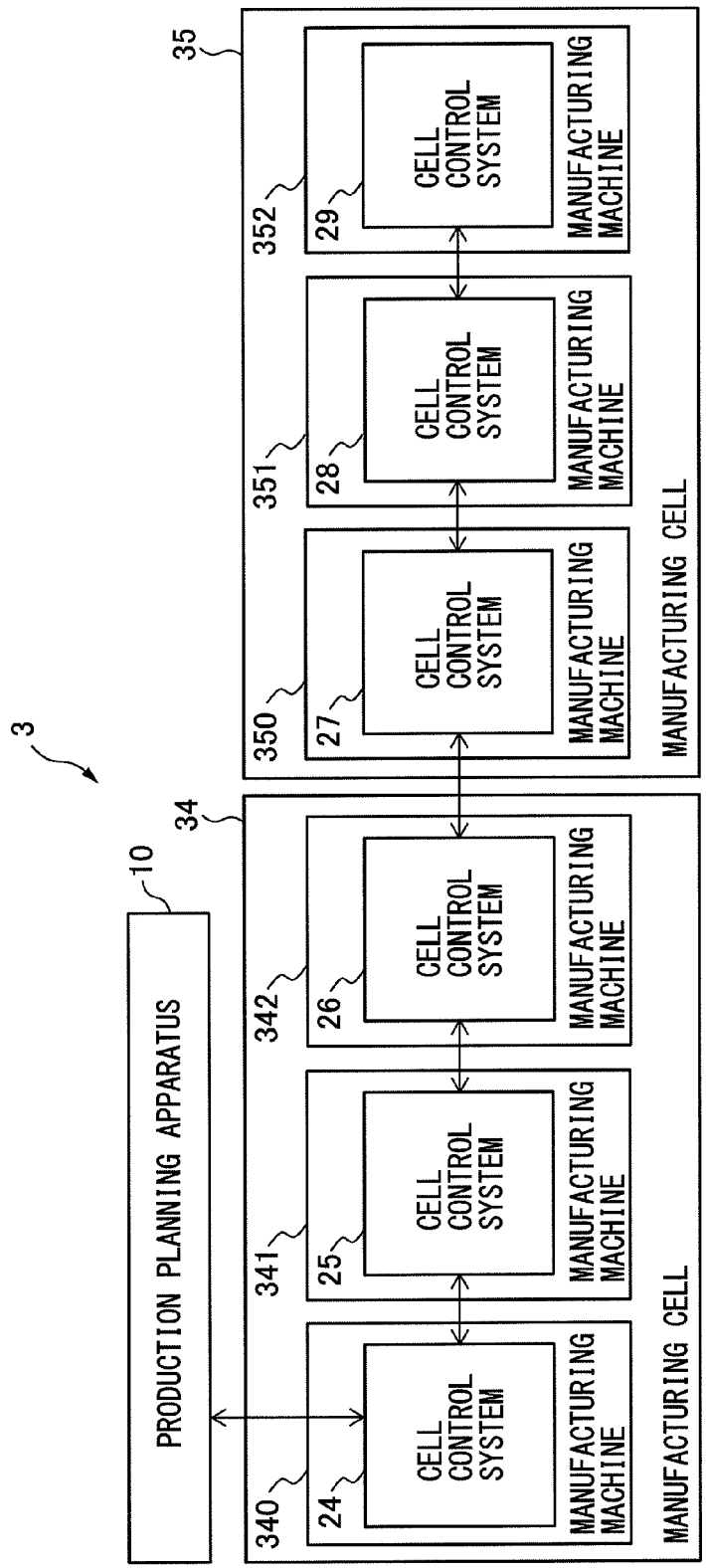
FIG. 10 is a block diagram illustrating an exemplary schematic configuration of a manufacturing system 3 according to a third embodiment.

FIG. 10 is a block diagram illustrating an exemplary schematic configuration of a manufacturing system 3 according to a third embodiment.

The manufacturing system 3 has a configuration similar to that of the manufacturing system 1 according to the first embodiment. However, in the manufacturing system 3, cell control systems 24 to 26 are mounted in manufacturing machines 340 to 342, respectively, of a manufacturing cell 34, and cell control systems 27 to 29 are mounted in manufacturing machines 350 to 352, respectively, of a manufacturing cell 35. The cell control systems 24 to 29 are connected to each other in a daisy chain configuration and communicate with respective adjacent cell control systems. Note that the cell control systems 24 to 29 may be connected to each other in a ring configuration or in a star configuration having as its center the cell control system 24 that communicates with a production planning apparatus 10.

Figure 11:
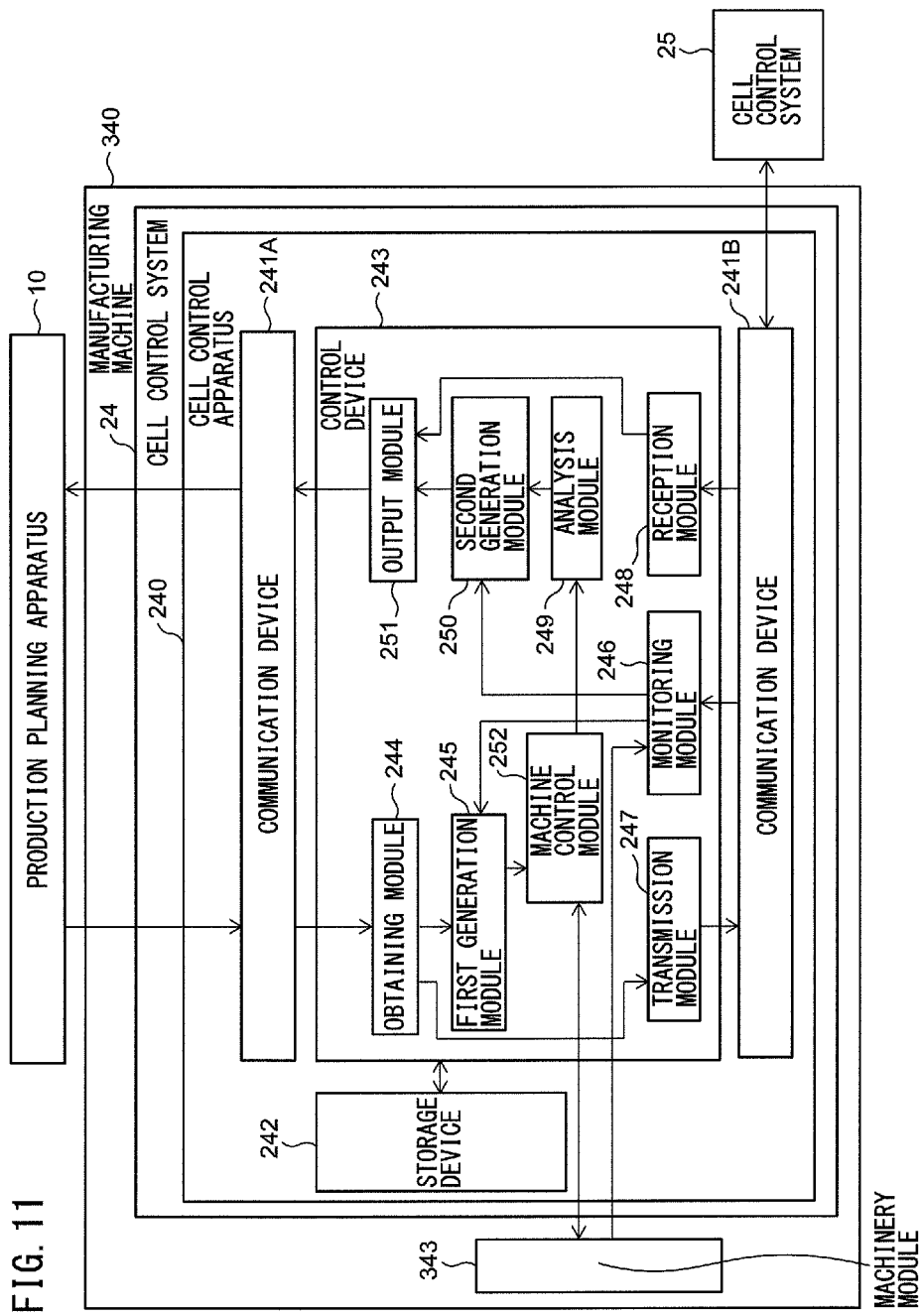
FIG. 11 is a block diagram illustrating an exemplary schematic configuration of a cell control system 24.

FIG. 11 is a block diagram illustrating an exemplary schematic configuration of the cell control system 24. Since the cell control systems 24 to 29 have the same configuration, the cell control system 24 will be described below as a representative and the differences between the cell control system 24 and other cell control systems will be described later.

The cell control system 24 has a configuration similar to that of the cell control system 20 according to the first embodiment. However, the cell control system 24 is mounted in the manufacturing machine 340 and connected to a machinery module 343 in the manufacturing machine 340. In addition, a communication device 241B communicates with only the cell control system 25 that is mounted in the manufacturing machine 341 of the manufacturing cell 34 and different from the manufacturing machine 340, without communicating with each manufacturing machine. Further, a control device 243 includes a machine control module 252, in addition to each module of the control device 203 according to the first embodiment. A monitoring module 246 obtains the current state of the manufacturing machine 340 from the machinery module 343.

Figure 12:
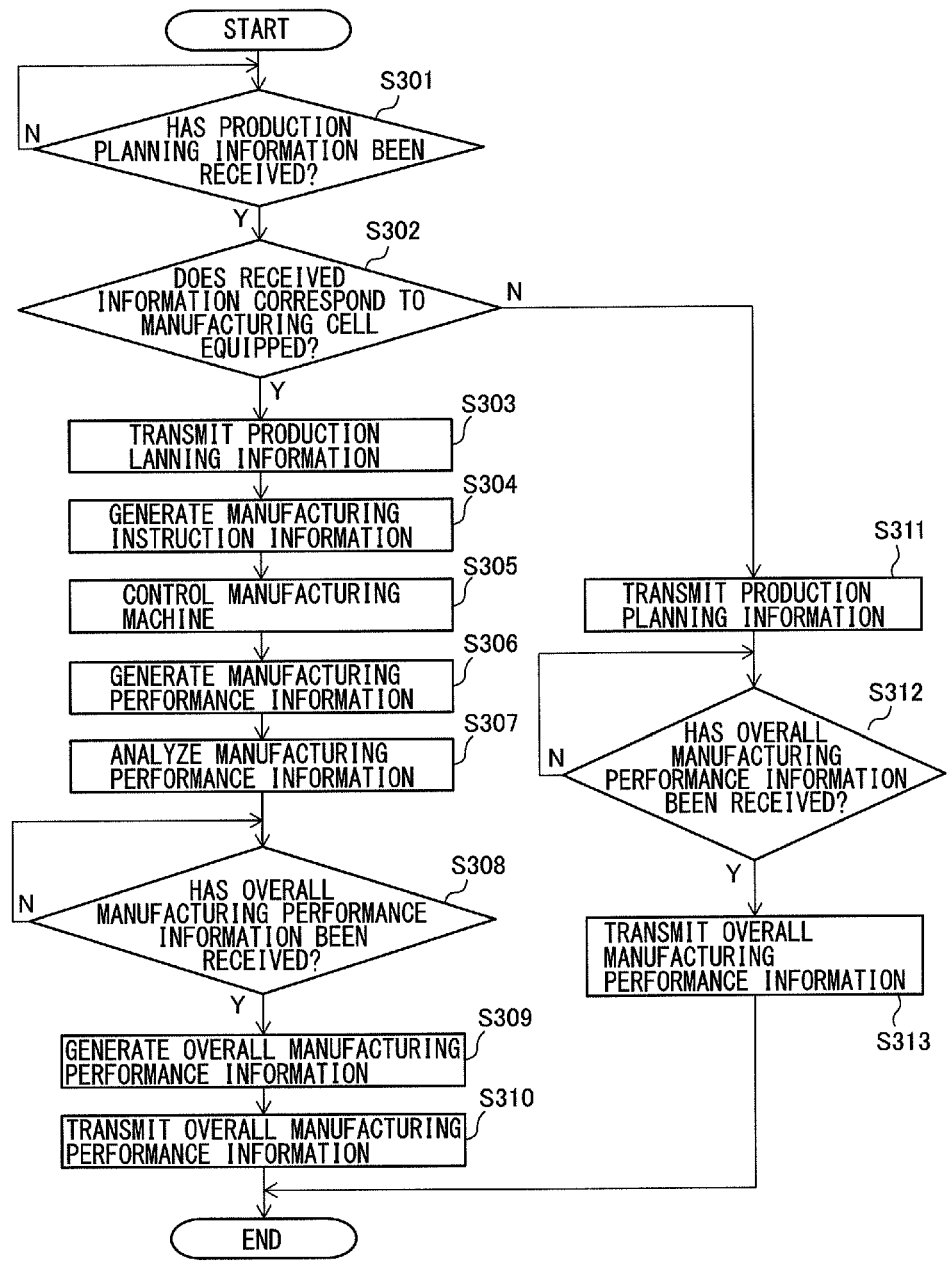
FIG. 12 is a flowchart illustrating operations for manufacturing cell control processing.

FIG. 12 is a flowchart illustrating operations for manufacturing cell control processing by the cell control system 24. The operations for manufacturing cell control processing will be described below with reference to the flowchart illustrated as FIG. 12. The following sequence of operations is executed in cooperation with each element of the cell control system 24 mainly by the control device 243 based on the program stored in a storage device 242 in advance. Further, since steps S301 and S310 to S313 in the following sequence of operations are the same as steps S101 and S110 to S113, respectively, illustrated as FIG. 5, a description thereof will not be given. Only steps S302 to S309 will be described hereinafter.

In step S302, an obtaining module 244 determines whether the received production planning information corresponds to a manufacturing cell equipped with the cell control system 24.

When the production planning information corresponds to a manufacturing cell equipped with the cell control system 24, a transmission module 247 transmits the production planning information to the cell control system 25 that communicates with the cell control system 24, via the communication device 241B (step S303). The cell control system 25 as a transmission destination of the production planning information is different from the production planning apparatus 10 as a transmission source of the production planning information. Since the production planning information corresponds to a manufacturing cell equipped with the cell control system 24, the transmission module 247 does not transmit the production planning information when the cell control system that communicates with the cell control system 24 is mounted in a manufacturing cell different from that equipped with the cell control system 24. The production planning information exemplifies first manufacturing information.

A first generation module 245 generates manufacturing instruction information corresponding to the manufacturing machine 340, based on the production planning information (step S304). The manufacturing instruction information exemplifies second manufacturing information.

The machine control module 252 controls the manufacturing machine 340 based on the manufacturing instruction information corresponding to the manufacturing machine 340 (step S305).

The machine control module 252 generates manufacturing performance information corresponding to the manufacturing machine 340 (step S306). The manufacturing performance information corresponds to the manufacturing instruction information corresponding to the manufacturing machine 340 and exemplifies third manufacturing information.

An analysis module 249 analyzes the manufacturing state based on the generated manufacturing performance information (step S307).

A reception module 248 stands by to receive overall manufacturing performance information from the cell control system 25 as a transmission source of the production planning information (step S308). The overall manufacturing performance information is generated based on the production planning information transmitted to the cell control system 25 and exemplifies fourth manufacturing information. The overall manufacturing performance information is generated based on the manufacturing instruction information corresponding to each of the manufacturing machines 341 and 342, other than the manufacturing machine 340, of the manufacturing cell 34.

A second generation module 250 generates overall manufacturing performance information for the entire manufacturing cell 34, based on the manufacturing performance information from the manufacturing machine 340 and the overall manufacturing performance information from the cell control system 25 (step S309). The overall manufacturing performance information exemplifies fifth manufacturing information.

The cell control systems 25 to 29 operate in accordance with the flowchart illustrated as FIG. 12, like the cell control system 24. However, a communication device of each of the cell control systems 25 to 29 communicates with two adjacent cell control systems. The communication device of each of the cell control systems 25 to 29 communicates with an adjacent cell control system, regardless of whether the latter cell control system is mounted in a manufacturing cell equipped with the former cell control system. One device or apparatus (or its own communication device) in any of the cell control systems 27 to 29 mounted in the manufacturing cell 35 may be directly communicably connected to the cell control system 24 which communicates with the production planning apparatus 10.

In step S301, an obtaining module of each of the cell control systems 25 to 29 receives production planning information corresponding to a manufacturing cell equipped with this cell control system from an adjacent cell control system via the communication device. In step S303, a transmission module of each of the cell control systems 25 to 29 transmits the production planning information to a cell control system that communicates with this cell control system and is different from the cell control system as a transmission source of the production planning information. In step S310, an output module of each of the cell control systems 25 to 29 transmits overall manufacturing performance information to the cell control system as a transmission source of the production planning information.

Manufacturing instruction information which corresponds to the manufacturing machine 341 and is generated by a first generation module of the cell control system 25 in step S304 exemplifies sixth manufacturing information. Manufacturing performance information which corresponds to the manufacturing machine 341 and is generated by a machine control module of the cell control system 25 in step S306 exemplifies seventh manufacturing information.

Production planning information received by the obtaining module of the cell control system 27 in step S301 exemplifies eighth manufacturing information. Manufacturing instruction information which corresponds to the manufacturing machine 350 and is generated by a first generation module of the cell control system 27 in step S304 exemplifies ninth manufacturing information. Manufacturing performance information which corresponds to the manufacturing machine 350 and is generated by a machine control module of the cell control system 27 in step S306 exemplifies 10th manufacturing information. Overall manufacturing performance information generated by a second generation module of the cell control system 27 in step S309 exemplifies 11th manufacturing information.

As described in detail above, with operations based on the flowchart illustrated as FIG. 12 as well, the manufacturing system 3 is capable of both efficient, error-free control of the manufacturing cells and easy, appropriate execution of production planning, quality management, and process management.

Although preferred embodiments have been described above, it is not limited to these embodiments.

Figure 13:
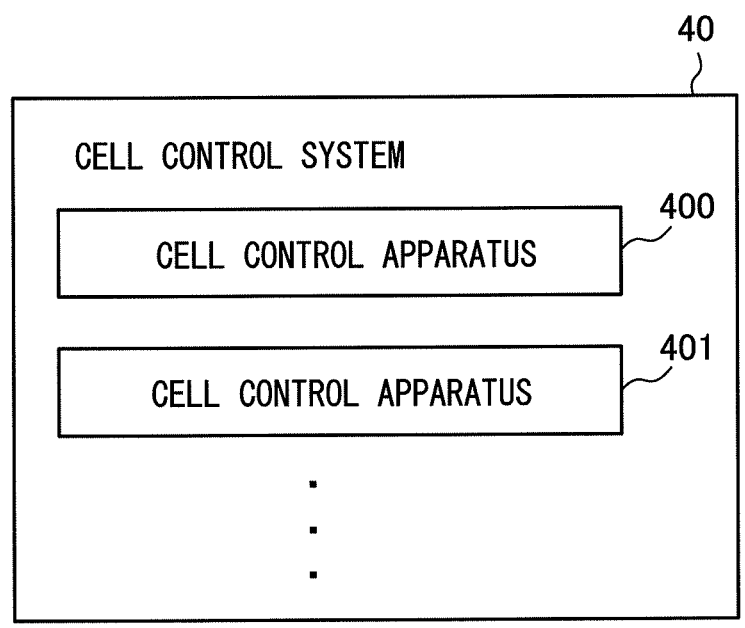
FIG. 13 is a schematic block diagram illustrating another exemplary cell control system.

FIG. 13 is a schematic block diagram illustrating another exemplary cell control system.

A cell control system 40 illustrated as FIG. 13 can be employed in place of the cell control systems 20 to 29 in the manufacturing systems 1 to 3 illustrated as FIGS. 1, 7, and 10, respectively. The cell control system 40 depicted as FIG. 13 includes a plurality of cell control apparatuses 400, 401, . . . . The cell control apparatuses 400 and 401 of the cell control system 40 are capable of mutual communication. Each of the cell control apparatuses 400 and 401 has the same function as that of a cell control apparatus of any of the cell control systems 20 to 29.

The cell control apparatuses 400 and 401 may share the functions of the cell control systems 20 to 29 to implement all these functions. In this case, the cell control apparatuses 400 and 401 may share these functions in any manner and respective modules of the cell control systems, including respective modules in the control devices, are appropriately interchangeably arranged in either the cell control apparatus 400 or 401.

Instead of a plurality of manufacturing cells, at least one manufacturing cell may suffice to implement each of the manufacturing systems 1 to 3. Similarly, instead of a plurality of cell control systems, at least one cell control system which communicates with the production planning apparatus 10 may suffice to implement each of the manufacturing systems 1 to 3. In addition, each of the manufacturing systems 1 to 3 may use an arbitrary computer in place of the production planning apparatus 10.

In the manufacturing systems 1 to 3, the cell control apparatuses 200, 220, and 240 may include input devices such as keyboards and display devices such as display screens. In this case, each of the cell control apparatuses 200, 220, and 240 may obtain manufacturing performance information from the input device in accordance with user's operation, instead of receiving it from the production planning apparatus 10. Similarly, each of the cell control apparatuses 200, 220, and 240 may output overall manufacturing performance information to the display device, instead of transmitting it to the production planning apparatus 10.

Although the first to third embodiments and another example of the cell control system have been described above, each of the first generation module and the second generation module is implemented in, e.g., a functional module built into software running on the processor, or an integrated circuit, a microprocessor, or firmware. In other words, preferable manufacturing information may be generated in accordance with various conditions but the generation process itself is fixed. When a method for efficiently controlling the manufacturing cell is determined in advance, the type of product, the specifications, the number of products to be manufactured, the appointed date of delivery, and the like are assumed in advance but it is practically difficult to satisfactorily cope with all their variations. In addition, when the type of product, the specifications, the number of products to be manufactured, the appointed date of delivery, or the like has varied more than expected, it may be no longer possible to generate preferable manufacturing information. Changing the type of software in response to each such variation, as found, only increases the burden on the operator or programmer.

Information defined in a manufacturing cell unit and representing the manufacturing state in which a plurality of manufacturing machines manufacture a plurality of products for control generally has a very large volume. It is, therefore, difficult to determine the type of information suitable for representing a feature of the manufacturing state and the type of process to be desirably performed to compress information.

In the following fourth embodiment, the cell control system according to the first embodiment is equipped with a learning device, which learns to output manufacturing instruction information to achieve a highest manufacturing efficiency in the manufacturing performance information for given production planning information by always repeating learning during the manufacture. Relevant information is selected from the collected information and a precise evaluation value is attained to compress overall manufacturing performance information.

Fourth Embodiment

Figure 14:
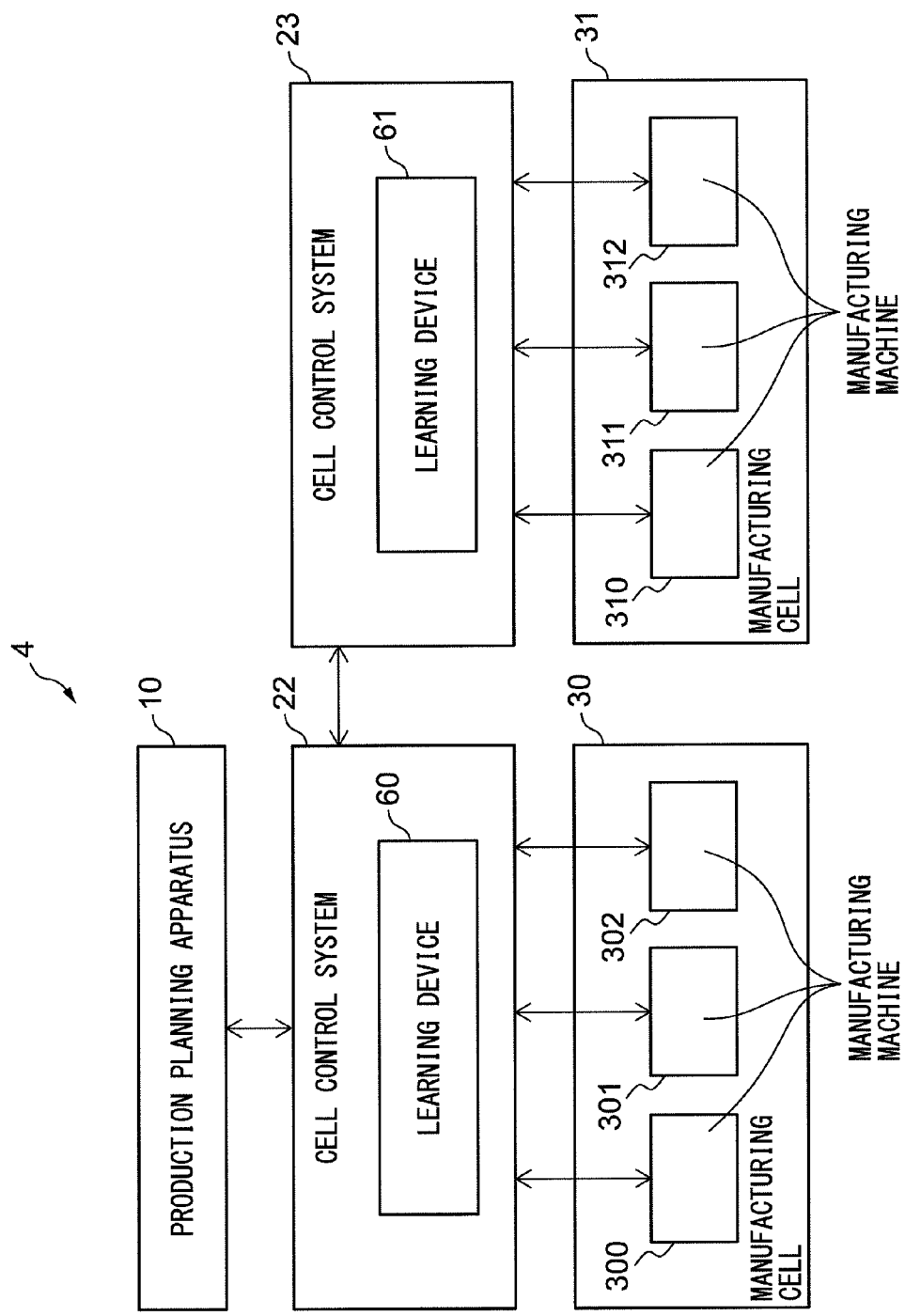
FIG. 14 is a block diagram illustrating an exemplary schematic configuration of a production system according to a fourth embodiment.

FIG. 14 is a block diagram illustrating an exemplary schematic configuration of a production system 4 according to a fourth embodiment.

In the production system 4 according to the fourth embodiment, differently from the cell control systems 20 and 21 according to the first embodiment, cell control systems 22 and 23 are provided with learning devices 60 and 61, respectively, and other parts in the fourth embodiment are the same as in the first embodiment.

Figure 15:
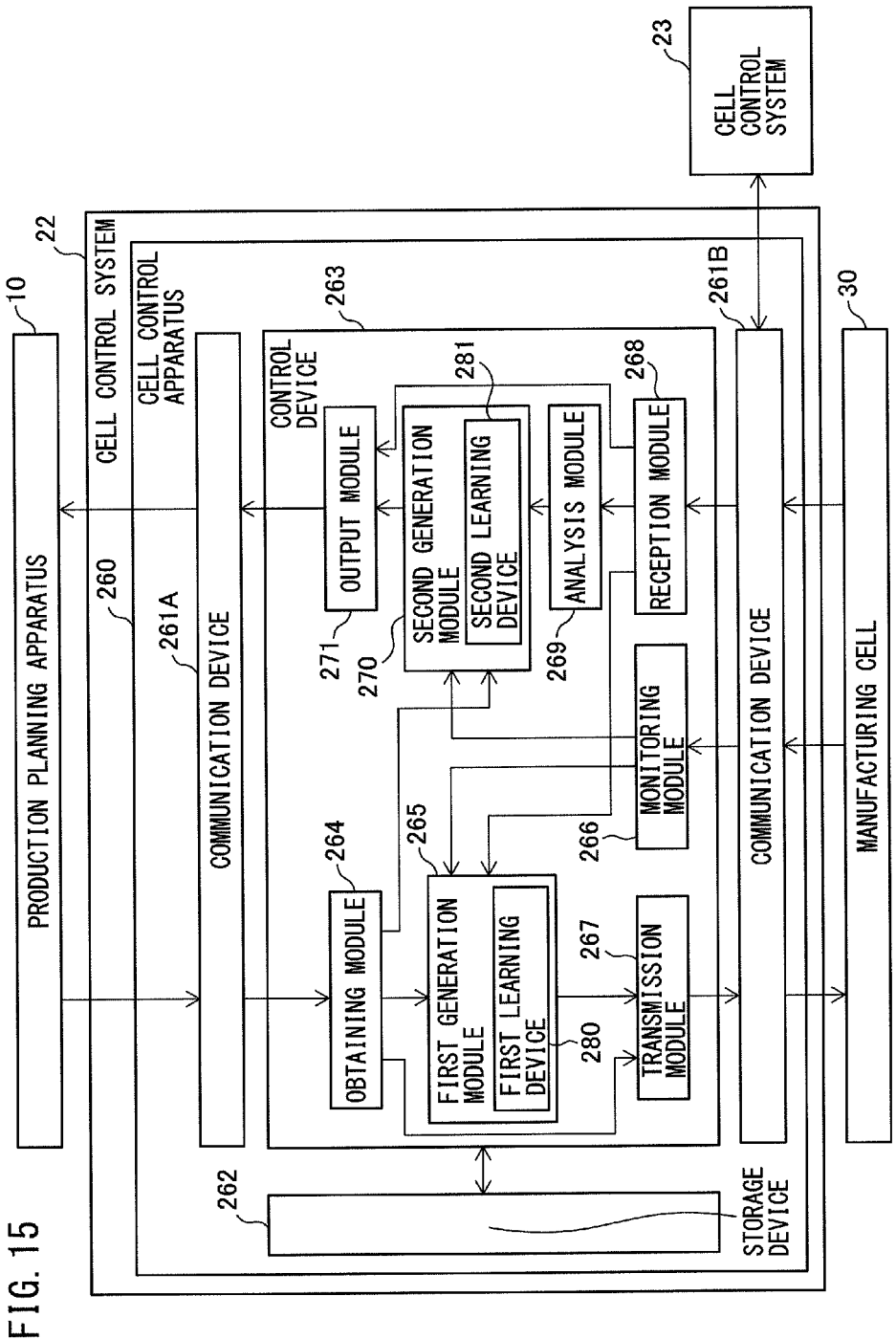
FIG. 15 is a block diagram illustrating another exemplary schematic configuration of the cell control system.

FIG. 15 is a block diagram illustrating an exemplary schematic configuration of the cell control system 22. Since the learning devices 60 and 61 mounted in the cell control systems 22 and 23, respectively, have the same configuration, the learning device 60 of the cell control system 22 will be described below as a representative.

The learning device 60 includes a first learning device 280 mounted in a first generation module 265, and a second learning device 281 mounted in a second generation module 270. The first learning device 280 generates second manufacturing information for each of a plurality of manufacturing machines 300 to 302 of a manufacturing cell 30, based on first manufacturing information defined in a manufacturing cell unit and associated with the manufacture of products from a production planning apparatus 10. The second learning device 281 generates fourth manufacturing information in a manufacturing cell unit based on third manufacturing information for each manufacturing machine corresponding to the second manufacturing information from each of the plurality of manufacturing machines 300 to 302. Note that the first learning device 280 uses part of the third manufacturing information as input and the second learning device 281 uses part of the first manufacturing information as input.

Figure 16:
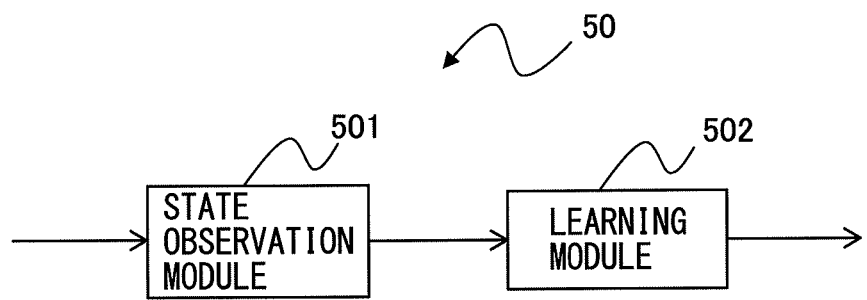
FIG. 16 is a principle block diagram of a learning device.

FIG. 16 is a principle block diagram of a learning device.

The first learning device 280 and the second learning device 281 have the configuration of a learning device 50 depicted as FIG. 16. The first learning device 280 will be described first.

The first learning device 280 includes a state observation module 501 and a learning module 502. The state observation module 501 observes a state variable including first manufacturing information defined in a manufacturing cell unit and associated with the manufacture of products from the production planning apparatus 10 and part of third manufacturing information for each manufacturing machine corresponding to the second manufacturing information from each of the plurality of manufacturing machines 300 to 302.

The learning module 502 learns a process for generating second manufacturing information based on the first manufacturing information in accordance with a data set created based on the state variable observed by the state observation module 501.

Figure 17:
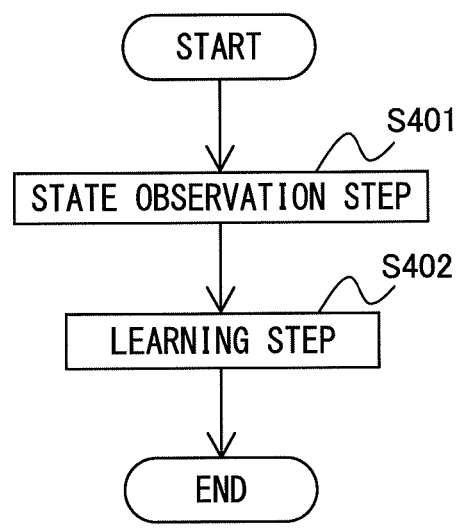
FIG. 17 is a flowchart illustrating the operation sequence of a machine learning method for a first learning device according to the fourth embodiment.

FIG. 17 is a flowchart illustrating the operation sequence of a machine learning method for the first learning device according to the fourth embodiment.

The machine learning method for the first learning device 280 includes state observation step S401 and learning step S402.

State observation step S401 is executed by the state observation module 501, i.e., first manufacturing information is obtained from an obtaining module 264 and third manufacturing information from a reception module 268 is observed.

Learning step S402 is executed by the learning module 502, i.e., a process for generating second manufacturing information is learned in accordance with a data set created based on the state variable observed by the state observation module 501.

The learning module 502 may use any type of learning algorithm. The learning device functions to extract, e.g., a useful rule, a knowledge representation, and a determination criterion by analysis from a set of data input to the device, output the determination results, and learn knowledge. A variety of techniques are available and roughly classified into "supervised learning," "unsupervised learning," and "reinforcement learning." To implement these techniques, another technique called "deep learning" in which extraction of feature amounts themselves is learned is available. These types of machine learning (machine learning device 1) are implemented by adopting, e.g., GPGPU (General-Purpose computing on Graphics Processing Units) or large-scale PC clusters.

The use of reinforcement learning will be described below as an example with reference to FIGS. 18 and 19. "Supervised learning," "unsupervised learning," and the like will be described later.

Figure 18:
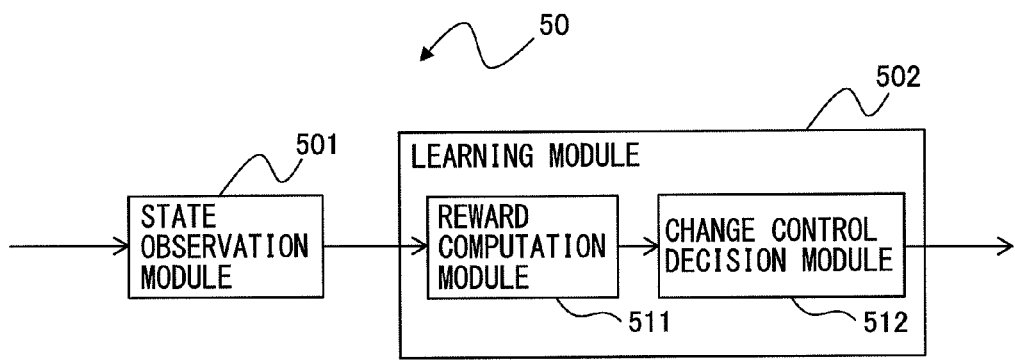
FIG. 18 is a principle block diagram of the first learning device to which reinforcement learning is applied in the fourth embodiment.

FIG. 18 is a principle block diagram of the first learning device to which reinforcement learning is applied in the fourth embodiment.

The learning module 502 includes a reward computation module 511 and a change control decision module 512. Since components other than the reward computation module 511 and the change control decision module 512 are the same as those illustrated in FIG. 16, the same reference numerals denote the same components and a detailed description thereof will not be given.

The reward computation module 511 computes a reward based on the third manufacturing information observed by the state observation module 501. The third manufacturing information is manufacturing performance information as represented as FIG. 6C and may further include, e.g., the energy consumed in the manufacture and the failure rate.

The change control decision module 512 learns a function (action value table) for generating second manufacturing information, based on the state variable observed by the state observation module 501 and the reward computed by the reward computation module 511. A method for learning the function (action value table) will be described later.

The learning module 502 may calculate, the state variable observed by the state observation module 501, in a multilayer structure and update the function (action value table) in real time, or accumulate information during the manufacture of a certain number of products, calculate a new function (action value table) from the accumulated information, and finally change or determine the function in consideration of, e.g., expected effects. The learning module 502 may, for example, update the function (action value table) for determining second manufacturing information, in accordance with a neural network model on the basis of the state variable observed by the state observation module 501 and the reward computed by the reward computation module 511. As a method for calculating the state variable in a multilayer structure, a multilayer neural network as illustrated as FIG. 23 (to be described later), for example, is available.

Figure 19:
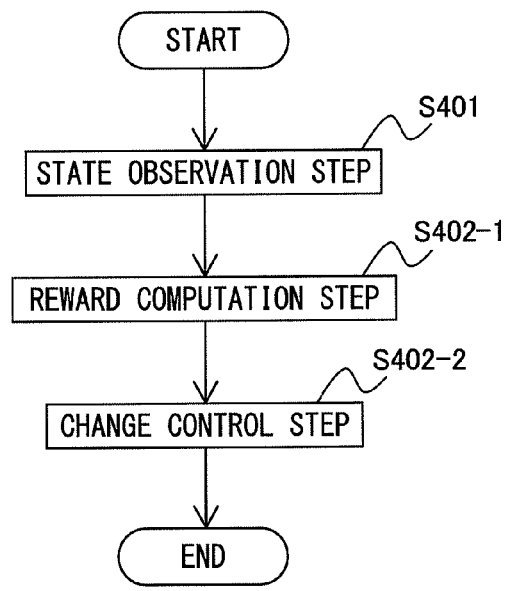
FIG. 19 is a flowchart illustrating the operation sequence of a machine learning method to which reinforcement learning is applied in the first learning device.

FIG. 19 is a flowchart illustrating the operation sequence of a machine learning method to which reinforcement learning is applied in the first learning device 280.

First, in state observation step S401, the state observation module 501 observes a state variable including first manufacturing information and part of third manufacturing information.

In reward computation step S402-1, the reward computation module 511 computes a reward based on the part of the third manufacturing information observed by the state observation module 501.

In change control step S402-2, the change control decision module 512 changes the function (action value table) for generating second manufacturing information, based on the state variable observed by the state observation module 501 and the reward computed by the reward computation module 511.

The first learning device 280 will be described in more detail next.

Figure 20:
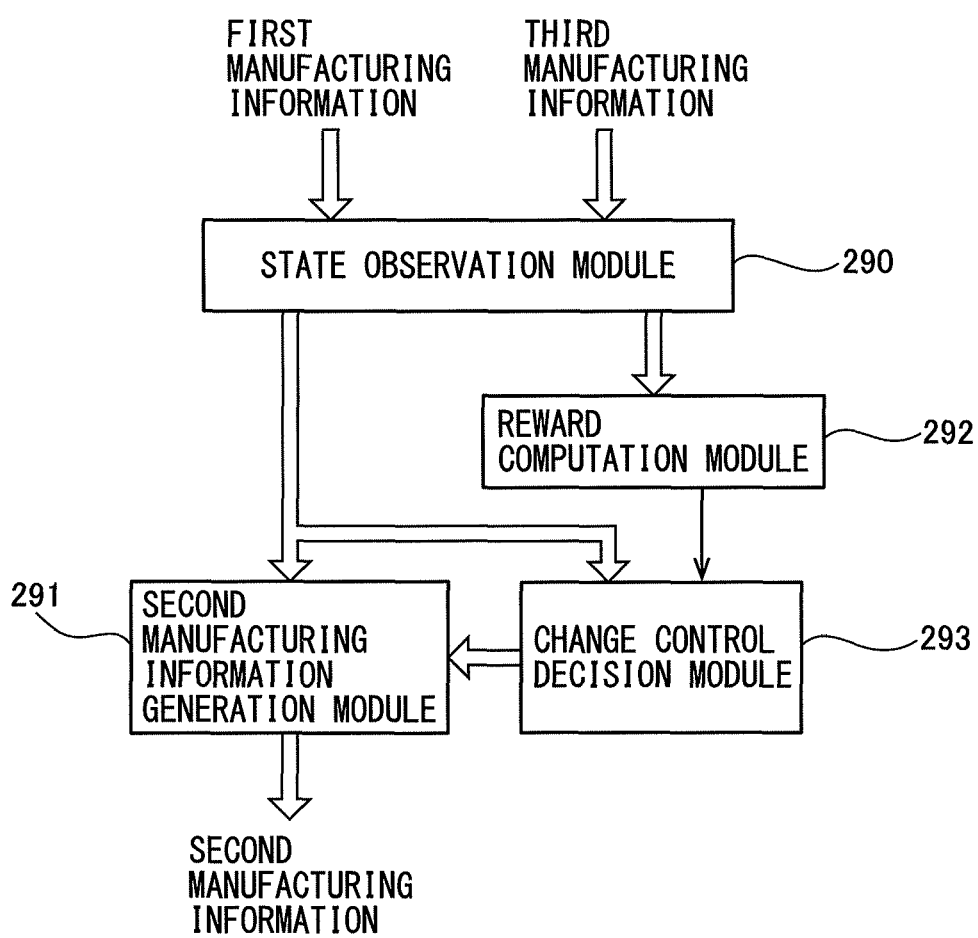
FIG. 20 is a principle block diagram illustrating the first learning device.

FIG. 20 is a principle block diagram illustrating the first learning device.

The first learning device 280 includes a state observation module 290, a second manufacturing information generation module 291, a reward computation module 292, and a change control decision module 293. The state observation module 290 observes, as a state variable, first manufacturing information and part of third manufacturing information used to compute a reward. The second manufacturing information generation module 291 generates second manufacturing information based on the first manufacturing information. The reward computation module 292 computes a reward based on the part of the third manufacturing information. The change control decision module 293 changes the function (action value table) of the second manufacturing information generation module 291 in the direction in which a greater reward is expected to be obtained, based on the first manufacturing information and the reward. At this time, since a serious problem may occur upon a change in function (action value table), the first manufacturing information and the reward may be stored in association with each other until information concerning a certain number of products is obtained, and a new function (action value table) of the second manufacturing information generation module 291 may be computed based on a predetermined amount or more of stored information. The change control decision module 293 desirably verifies that the computed new function (action value table) operates correctly, and thereupon updates the new function (action value table) of the second manufacturing information generation module 291.

Figure 21:
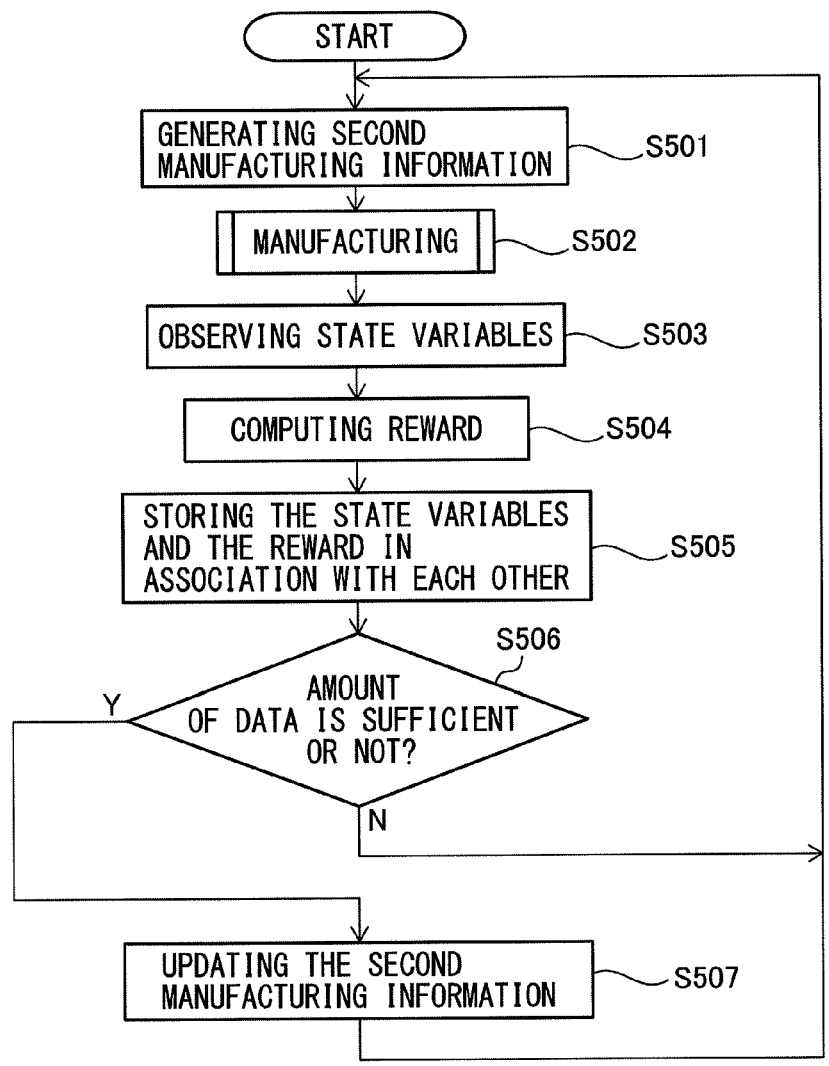
FIG. 21 is a flowchart illustrating an operation sequence according to which the first learning device that employs reinforcement learning learns.

FIG. 21 is a flowchart illustrating an operation sequence according to which the first learning device 280 that employs reinforcement learning learns in the fourth embodiment.

In step S501, second manufacturing information is generated based on the first manufacturing information and outputs it to the manufacturing cell 30.

In step S502, the manufacturing cell 30 manufactures in accordance with the second manufacturing information.

In step S503, the reception module 268 acquires third manufacturing information, and the state observation module 290 of the first learning device 280 observes, as a state variable, the first manufacturing information and part of the third manufacturing information and outputs the part of the third manufacturing information to the reward computation module 292.

In step S504, the reward computation module 292 computes a reward based on the part of the third manufacturing information.

In step S505, the change control decision module 293 stores the first manufacturing information and the reward in association with each other.

In step S506, it is determined whether the amount of data accumulated is sufficient to change the function (action value table) of the second manufacturing information generation module 291. If NO is determined in step S506, the process returns to step S501; otherwise, the process advances to step S507. Steps S505 and S506 are unnecessary when the function (action value table) of the second manufacturing information generation module 291 is changed based on the reward for each manufacturing operation. Another modification is possible in which steps S505 and S506 are executed until a certain amount of information is accumulated from the start of operation of the production system and thereafter the process skips steps S505 and S506 and advances to step S507.

In step S507, the change control decision module 293 performs an update process for changing the function (action value table) of the second manufacturing information generation module 291 in the direction in which a greater reward is expected to be obtained, and the process returns to step S501. Subsequently, the processes in steps S501 to S507 are repeated during the operation of the production system.

The first learning device 280 will be described in more detail next. The first learning device 280 functions to extract, e.g., a useful rule, a knowledge representation, and a determination criterion by analysis from an input set of data, output the determination results, and learn knowledge.

Learning algorithms for the first learning device 280 are roughly classified into "supervised learning," "unsupervised learning," and "reinforcement learning," as described above. To implement these techniques, another technique called "deep learning" in which extraction of feature amounts themselves is learned is available. These types of machine learning (machine learning device 1) are implemented by adopting, e.g., GPGPU (General-Purpose computing on Graphics Processing Units) or large-scale PC clusters.

In "supervised learning," a large number of data sets of certain inputs and results (labels) are fed into a machine learning device to learn features seen in these data sets and inductively acquire a model for estimating the result from the input, i.e., their relationship. This supervised learning can be applied to the fourth embodiment to determine second manufacturing information based on the first manufacturing information. "Supervised learning" can be implemented using an algorithm such as a neural network (to be described later).

"Unsupervised learning" is a technique for feeding only input data into the first learning device 280 in large amounts to learn the distribution of the input data and, in turn, to learn a device which performs, e.g., compression, classification, and shaping for the input data without corresponding teacher output data. This allows, e.g., clustering of features seen in these data sets into similar features. The obtained result can be used to define any norm and allocate outputs so as to optimize it, thereby predicting output.

Intermediate problem setting between "unsupervised learning" and "supervised learning," called "semi-supervised learning," is also available. "Semi-supervised learning" applies when only some data serve as data sets of inputs and outputs and the remaining data include only inputs (e.g., simulation data).

The use of reinforcement learning as a learning algorithm for the first learning device 280 will be described first as an example.

Reinforcement learning problem setting will be considered as follows:

The first learning device 280 observes first manufacturing information and part of third manufacturing information to determine second manufacturing information (action);

The environment may change depending on any rule and an individual person may change the environment by his or her own action;

A reward signal is returned every time action is taken;

The reward is targeted for maximization;

Learning starts in the state in which a result brought about by the action is totally unknown or known only incompletely. In other words, the result (product) of the operation of the production system can be obtained as data only after the production system operates actually. This means that an optimal action is preferably searched by trial and error; and Learning can be started at a good starting point assuming that the state in which learning has been performed in advance so as to imitate human behaviors (a technique such as the above-mentioned supervised learning or reverse reinforcement learning) is initial.

In "reinforcement learning," in addition to determination and classification, an action is learned to learn an appropriate action in consideration of interactions exerted on the environment by the action, i.e., learn to maximize the reward to be obtained in the future. This means that the fourth embodiment can acquire an action which influences the future, e.g., is capable of determining second manufacturing information available to satisfactorily manufacture products based on the first manufacturing information. Although this description will be followed by an example of Q-learning, the present invention is not limited to this.

Q-learning is a method for learning a value Q(s, a) of selection of an action a in a particular environmental state s. In other words, an action a having the highest value Q(s, a) in the particular state s may be selected as an optimal action. However, at first, a correct value Q(s, a) is totally unknown for a pair of a state s and an action a. The agent (the subject of an action) selects various actions a in the particular state s and rewards are offered for the actions a. With this operation, the agent learns to select a better action, i.e., a correct value Q(s, a).

To maximize the sum of rewards to be obtained in the future as a result of the actions, $Q(s, a) = E[\Sigma\gamma^t r_t]$ is to be finally satisfied. The expected value is taken in response to a change in state that follows an optimal action and is an unknown value, which is learned by a search. An update expression of such a value Q(s, a) is given by, e.g.:

$$Q(s_t, a_t) \leftarrow Q(s_t, a_t) + \alpha\left(r_{t+1} + \gamma\max_a Q(s_{t+1}, a) - Q(s_t, a_t)\right) \quad (1)$$

where $s_t$ is the environmental state at time t and $a_t$ is the action at time t. Upon the action $a_t$, the state changes to $s_{t+1}$. $r_{t+1}$ is the reward received upon a change in state. The term attached with max is the product of the Q-value multiplied by γ when an action a having the highest Q-value known in the state $s_{t+1}$ is selected. γ is a parameter called the discount factor, satisfying $0<\gamma\leq 1$. α is a learning factor satisfying $0<\alpha\leq 1$.

Expression (1) represents a method for updating the evaluation value $Q(s_t, a_t)$ of the action $a_t$ in the state $s_t$, based on the reward $r_{t+1}$ returned as a result of the trial $a_t$. When the evaluation value $Q(s_{t+1}, \max a_{t+1})$ of the best action max a in the subsequent state based on the sum of the reward $r_{t+1}$ and the action a is greater than the evaluation value $Q(s_t, a_t)$ of the action a in the state s, $Q(s_t, a_t)$ is increased; otherwise, $Q(s_t, a_t)$ is reduced. In other words, the value of a particular action in a particular state is brought close to the value of the best action in the subsequent state based on the reward immediately returned as a result and the particular action.

Methods for representing Q(s, a) on the computer include a method for holding the numerical values of all state-action pairs (s, a) in the form of a table (action value table) and a method for providing a function that approximates Q(s, a). With the latter method, the above-mentioned update expression can be implemented by adjusting the parameter of an approximation function using a technique such as the stochastic gradient descent method. A neural network (to be described later) can be used as the approximation function.

Figure 22:
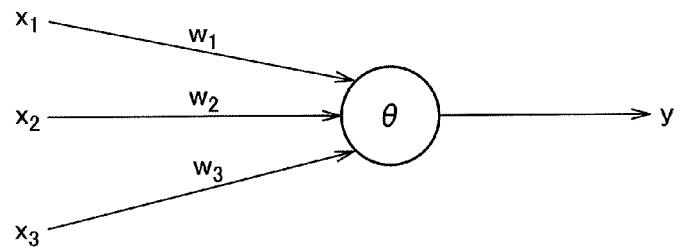
FIG. 22 is a schematic diagram representing a model of neurons.

Neural networks can also be used as approximation algorithms for value functions in supervised learning, unsupervised learning, and reinforcement learning. The neural network is implemented by, e.g., an arithmetic device and a memory which implement a neural network imitating a model of neurons as illustrated as, e.g., FIG. 8. FIG. 22 is a schematic diagram representing a model of neurons.

The neurons serve to output, output y for a plurality of inputs x (FIG. 22 illustrates inputs x1 to x3 as an example), as illustrated as FIG. 22. Each of the inputs x1 to x3 is multiplied by a weight w (w1 to w3) corresponding to the input x. With this operation, the neurons output, output y given by:

$$y = f_k(\Sigma_{i=1}^n x_i w_i - \theta) \quad (2)$$

where θ is the bias and $f_k$ is the activation function. Note that all of the input x, the output y, and the weight w are vectors.

Figure 23:
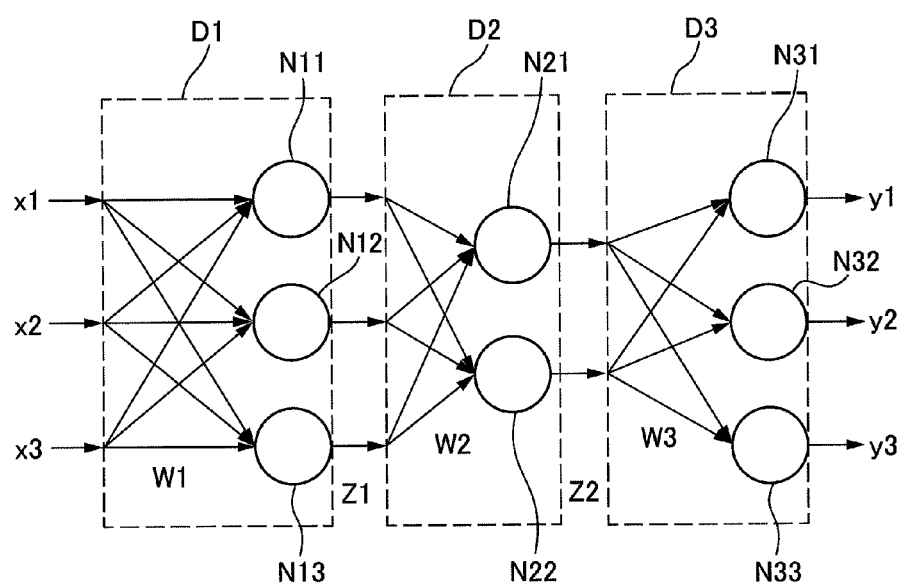
FIG. 23 is a schematic diagram depicting a neural network having the weight of three layers D1 to D3.

A neural network having the weight of three layers that combine the above-mentioned neurons together will be described below with reference to FIG. 23. FIG. 23 is a schematic diagram depicting a neural network having the weight of three layers D1 to D3.

A plurality of inputs x (in this example, inputs x1 to x3) are input from the left of the neural network and results y (in this example, results y1 to y3) are output from the right of this network, as illustrated as FIG. 23.

More specifically, the inputs x1 to x3 are multiplied by a weight corresponding to each of three neurons N11 to N13 and input. The weights that multiply these inputs are collectively referred to as w1 herein.

The neurons N11 to N13 output z11 to z13, respectively. Referring to FIG. 23, z11 to z13 are collectively referred to as feature vectors z1 and can be regarded as vectors obtained by extracting the feature amounts of input vectors. The feature vectors z1 are defined between the weights w1 and w2. z11 to z13 are multiplied by a weight corresponding to each of two neurons N21 and N22 and input. The weights that multiply these inputs are collectively referred to as w2 herein.

The neurons N21 and N22 output z21 and z22, respectively. Referring to FIG. 23, z21 and z22 are collectively referred to as feature vectors z2. The feature vectors z2 are defined between the weights w2 and w3. The feature vectors z21 and z22 are multiplied by a weight corresponding to each of three neurons N31 to N33 and input. The weights that multiply these feature vectors are collectively referred to as w3 herein.

Lastly, the neurons N31 to N33 output results y1 to y3, respectively.

The operation of the neural network includes a learning mode and a value prediction mode. For example, the weight w is learned using a learning data set in the learning mode and action determination of an assembly device is performed in the prediction mode. Although the term "prediction" is used for the sake of convenience, a variety of tasks such as detection, classification, and inference are possible, as a matter of course.

Data obtained by actually operating the assembly device in the prediction mode can be immediately learned and reflected on the subsequent action (online learning), or a group of data collected in advance can be used to perform collective learning and since then the detection mode is executed using the same parameters (batch learning). As another, intermediate approach, the learning mode can be interposed every time a certain amount of data is accumulated.

The weights w1 to w3 can be learned by the error backpropagation method. The information of errors enters from the right and flows to the left. The error backpropagation method is used to adjust (learn) each weight to reduce the difference between the output y and the true output y (teacher) when the input x is input.

Such a neural network can have layers increased in number from three (called deep learning). It is possible to extract features of the input stepwise to automatically acquire an arithmetic device which returns a result from only teacher data.

The first learning device 280 according to the fourth embodiment includes a state observation module 290, a second manufacturing information generation module 291, a reward computation module 292, and a change control decision module 293, as illustrated as, e.g., FIG. 20, to execute the above-described Q-learning. However, the machine learning method applied to the present invention is not limited to Q-learning, as mentioned earlier. In other words, various techniques such as "supervised learning," "unsupervised learning," "semi-supervised learning," and "reinforcement learning" that can be used by the first learning device 280 are applicable. These types of machine learning (first learning device 280) can be implemented by adopting, e.g., GPGPU or large-scale PC clusters. When, e.g., supervised learning is adopted, the value function corresponds to a learning model and the reward corresponds to an error. A function approximated using the above-mentioned neural network can also be used as the action value table and this is effective especially when the amounts of information of s and a are considerable.

The second learning device 281 will be described next. The second learning device 281 has the block configuration illustrated as FIG. 16 and executes a machine learning method in accordance with the flowchart illustrated as FIG. 17, like the first learning device 280.

The second learning device 281 is implemented using a neural network. The second learning device 281 learns (trains) by "supervised learning" outside before the activation of the production system and is mounted in the second generation module 270 at the end of learning. Therefore, since the neural network may not be changed after mounting, an arithmetic circuit which can obtain at least one output by processing such as addition after weighting the input may be used.

Figure 24A:
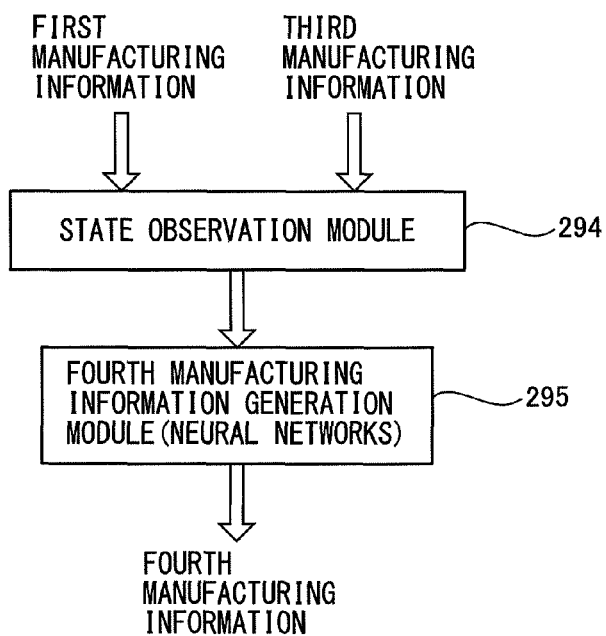
FIG. 24A is a diagram illustrating the configuration of a second learning device.
Figure 24B:
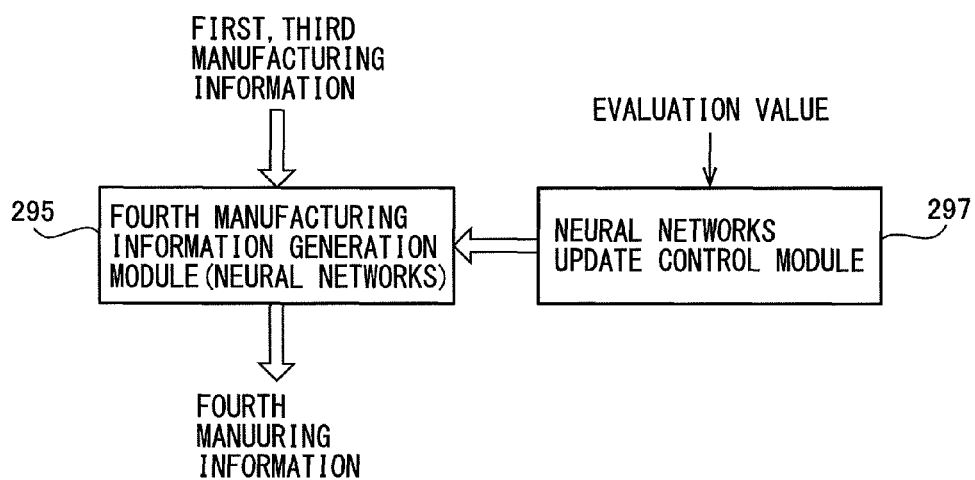
FIG. 24B is a diagram illustrating a configuration during training on the exterior of the second learning device.

FIG. 24A is a diagram illustrating the configuration of a second learning device, and FIG. 24B is a diagram illustrating a configuration during training on the exterior.

The second learning device 281 includes a state observation module 294 which observes first manufacturing information and third manufacturing information as a state variable, and a fourth manufacturing information generation module 295 which generates fourth manufacturing information based on the first manufacturing information and the third manufacturing information, as illustrated as FIG. 24A. The fourth manufacturing information generation module 295 is implemented in, e.g., a neural network.

During learning (training) on the exterior, a neural network update control module 297 is connected to the fourth manufacturing information generation module 295, as illustrated as FIG. 24B. The neural network update control module 297 is implemented in software by, e.g., a computer equipped with software for implementing the fourth manufacturing information generation module 295.

As the number of manufacturing machines and the number of types of products increase, the volume of information defined in a manufacturing cell unit and representing the manufacturing state, i.e., third manufacturing information generally remarkably increases. In a production system including a plurality of cell control systems, the total amount of fourth manufacturing information collected by the production planning apparatus 10 is also large. Therefore, the fourth manufacturing information is desirably compressed by limitation to information appropriately representing the manufacturing state of the manufacturing cell. Further, an evaluation value appropriately representing the manufacturing state of the manufacturing cell is desirably generated from the third manufacturing information and defined as overall manufacturing performance information to more greatly compress information.

During training, various types of data are input to the fourth manufacturing information generation module 295 as third manufacturing information. First manufacturing information is also input to the fourth manufacturing information generation module 295 because the manufacturing state varies depending on the first manufacturing information. Second manufacturing information can be input in place of first manufacturing information. In this state, the input to the fourth manufacturing information generation module 295 is changed so that the neural network update control module 297 generates an evaluation value for the changed input. For example, the operator feeds an evaluation result into the neural network update control module 297 because he or she can determine good or poor of the manufacturing state based on the input (pieces of first and third manufacturing information) to the fourth manufacturing information generation module 295. The neural network update control module 297 updates the neural network of the fourth manufacturing information generation module 295 so that the fourth manufacturing information generation module 295 outputs an evaluation value corresponding to the evaluation result. By repeating this operation, learning (training) of a neural network in the fourth manufacturing information generation module 295 is performed.

The second learning device 281 including the state observation module 294 and the fourth manufacturing information generation module 295 including the neural network after the completion of training is mounted in the second generation module 270. At this time, it is desired not to input, to the second learning device 281, third manufacturing information that contributes (influences) little to generation of fourth manufacturing information. First manufacturing information (or second manufacturing information) that contributes (influences) little to generation of fourth manufacturing information is not input, either. The number of evaluation values output from the fourth manufacturing information generation module 295 is not limited to one and may be greater than one.

As described above, in the fourth embodiment, a first learning device having the reinforcement learning function is used to always repeat learning during the manufacture, upon defining production planning information and manufacturing performance information as the input of the first learning device and manufacturing instruction information as the output of the first learning device, thereby allowing the first learning device to learn to output the manufacturing instruction information so as to achieve a highest manufacturing efficiency in the manufacturing performance information for given production planning information. Using such a first learning device, even if any manufacturing machine of the manufacturing cell malfunctions, a notification to that effect is input to the first learning device based on the manufacturing performance information, and manufacturing instruction information indicating that the malfunctioning manufacturing machine is not to be selected is output, thereby keeping the efficiency of the manufacturing cell high. In addition, the information size can be reduced by extracting feature amounts from information in a manufacturing cell unit, using the second learning device. The use of a neural network as the second learning device makes it possible to output the current evaluation value for processing in the manufacturing cell from the input values of the current value, the processing time, the ambient temperature, and the product size. Defining the output information as overall manufacturing performance information allows considerable compression of information. The manufacturing quality can be accurately evaluated by generating information in a manufacturing cell unit, using the second learning device.

A device outside the cell control system can perform manufacturing-related management by handling only information defined in a manufacturing cell unit without recognizing individual manufacturing machines. Hence, the cell control system is capable of both efficient, error-free control of the manufacturing cells and appropriate execution of quality management and process management.

What is claimed is:

1. A cell control system comprising:
   a communication device for communicating with a production planning apparatus and a manufacturing cell comprising a plurality of manufacturing machines configured to manufacture a product;
   an obtaining module for obtaining first manufacturing information defined in a manufacturing cell unit associated with the manufacture of the product from the production planning apparatus via the communication device;
   a first generation module for generating a plurality of pieces of second manufacturing information for the plurality of manufacturing machines, respectively, based on the first manufacturing information;
   a transmission module for transmitting the plurality of pieces of second manufacturing information to the plurality of manufacturing machines, respectively, via the communication device;
   a reception module for receiving manufacturing machine-specific, third manufacturing information corresponding to the second manufacturing information from each of the plurality of manufacturing machines;
   a second generation module for generating fourth manufacturing information defined in the manufacturing cell unit, based on the third manufacturing information from each of the plurality of manufacturing machines; and
   an output module for outputting the fourth manufacturing information,
   wherein the production planning apparatus performs manufacturing-related management by handling only the first manufacturing information defined in the manufacturing cell unit without recognizing individual manufacturing machines of the plurality of manufacturing machines, and
   wherein the production planning apparatus handles only the first manufacturing information when the obtaining module obtains production planning information from the production planning apparatus.

2. The cell control system according to claim 1, wherein each of the manufacturing machines comprises one of a processing machine, a robot, a PLC, a conveyor, a measuring device, a tester, a press machine, a press fitting machine, a printing press, a die-casting machine, an injection-molding machine, a food machine, a packaging machine, a welding machine, a cleaning machine, a coating machine, an assembling device, a mounting machine, a woodworking machine, a sealing device, and a cutter.

3. The cell control system according to claim 1, wherein the first manufacturing information comprises production planning information representing a production plan of the product defined in a manufacturing cell unit, and the second manufacturing information comprises manufacturing instruction information representing a manufacturing instruction of the product defined in a manufacturing machine unit.

4. The cell control system according to claim 1, wherein the third manufacturing information comprises manufacturing performance information representing manufacturing performance of the product defined in a manufacturing machine unit, and
the fourth manufacturing information comprises manufacturing performance information representing manufacturing performance of the product defined in a manufacturing cell unit.

5. The cell control system according to claim 1, wherein the output module outputs the fourth manufacturing information by transmitting the fourth manufacturing information to the production planning apparatus via the communication device.

6. The cell control system according to claim 1, wherein the first generation module comprises a first learning device which generates the second manufacturing information using the first manufacturing information as input.

7. The cell control system according to claim 6, wherein the first learning device further generates the second manufacturing information using part of the third manufacturing information as input.

8. The cell control system according to claim 6, wherein the second generation module comprises a second learning device which generates the fourth manufacturing information using the third manufacturing information as input.

9. The cell control system according to claim 8, wherein the second learning device generates the fourth manufacturing information using part of the first manufacturing information as input.

10. A cell control system mounted in a first manufacturing machine of a manufacturing cell comprising a plurality of manufacturing machines configured to manufacture a product, the cell control system comprising:
 a communication device for communicating with a second manufacturing machine other than the first manufacturing machine in the manufacturing cell;
 an obtaining module for obtaining first manufacturing information defined in a manufacturing cell unit associated with the manufacture of the product;
 a first generation module for generating manufacturing machine-specific, second manufacturing information corresponding to the first manufacturing machine, and manufacturing machine-specific, third manufacturing information corresponding to the second manufacturing machine, based on the first manufacturing information;
 a transmission module for transmitting the third manufacturing information to the second manufacturing machine via the communication device;
 a machine control module for controlling the first manufacturing machine based on the second manufacturing information and generating manufacturing machine-specific, fourth manufacturing information corresponding to the second manufacturing information;
 a reception module for receiving manufacturing machine-specific, fifth manufacturing information corresponding to the third manufacturing information from the second manufacturing machine via the communication device;
 a second generation module for generating sixth manufacturing information defined in the manufacturing cell unit, based on the fourth manufacturing information and the fifth manufacturing information; and
 an output module for outputting the sixth manufacturing information.

11. A cell control system mounted in a first manufacturing machine of a manufacturing cell comprising a plurality of manufacturing machines configured to manufacture a product, the cell control system comprising:
 a communication device for communicating with a second cell control system, other than the cell control system, mounted in a second manufacturing machine other than the first manufacturing machine in the manufacturing cell;
 an obtaining module for obtaining first manufacturing information defined in a manufacturing cell unit associated with the manufacture of the product;
 a transmission module for transmitting the first manufacturing information to the second cell control system via the communication device;
 a first generation module for generating manufacturing machine-specific, second manufacturing information corresponding to the first manufacturing machine, based on the first manufacturing information;
 a machine control module for controlling the first manufacturing machine based on the second manufacturing information and generating manufacturing machine-specific, third manufacturing information corresponding to the second manufacturing information;
 a reception module for receiving, from the second cell control system via the communication device, fourth manufacturing information defined in a manufacturing cell unit and generated based on the first manufacturing information;
 a second generation module for generating fifth manufacturing information defined in the manufacturing cell unit, based on the third manufacturing information and the fourth manufacturing information; and
 an output module for outputting the fifth manufacturing information.

12. The cell control system according to claim 11, wherein the communication device further communicates with a production planning apparatus which plans the manufacture of the product,
the obtaining module obtains the first manufacturing information by receiving the first manufacturing information from the production planning apparatus via the communication device, and
the output module outputs the fifth manufacturing information by transmitting the fifth manufacturing information to the production planning apparatus via the communication device.

13. A manufacturing system comprising:
a manufacturing cell comprising a plurality of manufacturing machines comprising the first manufacturing machine equipped with the cell control system according to claim 12, wherein
the second cell control system comprising:
 a second communication device for communicating with the cell control system;
 a second obtaining module for receiving the first manufacturing information from the cell control system via the second communication device;
 a third generation module for generating manufacturing machine-specific, sixth manufacturing information corresponding to the second manufacturing machine, based on the first manufacturing information;

a second machine control module for controlling the second manufacturing machine based on the sixth manufacturing information and generating manufacturing machine-specific, seventh manufacturing information corresponding to the second manufacturing machine;

a fourth generation module for generating the fourth manufacturing information based on the seventh manufacturing information; and a second output module for transmitting the fourth manufacturing information to the cell control system via the second communication device.

14. The manufacturing system according to claim 12, further comprising:

a second manufacturing cell which is different from the manufacturing cell and comprises a plurality of manufacturing machines comprising a third manufacturing machine equipped with a third cell control system different from the cell control system and the second cell control system, the third cell control system comprising:

a third communication device for communicating with a fourth manufacturing machine other than the third manufacturing machine of the second manufacturing cell and one of the cell control system and the second cell control system;

a third obtaining module for receiving, from one of the cell control system and the second cell control system via the third communication device, eighth manufacturing information defined in a manufacturing cell unit associated with the manufacture of the product and corresponds to the second manufacturing cell;

a fifth generation module for generating manufacturing machine-specific, ninth manufacturing information corresponding to the third manufacturing machine, based on the eighth manufacturing information;

a third machine control module for controlling the third manufacturing machine based on the ninth manufacturing information and generating manufacturing machine-specific, 10th manufacturing information corresponding to the third manufacturing machine;

a sixth generation module for generating, based on the 10th manufacturing information, 11th manufacturing information in the manufacturing cell unit defined by the second manufacturing cell; and a third output module for transmitting the 11th manufacturing information to one of the cell control system and the second cell control system via the third communication device.

15. A method for controlling a cell control system comprising a communication device which communicates with a production planning apparatus and a manufacturing cell comprising a plurality of manufacturing machines configured to manufacture a product, the method comprising:

obtaining first manufacturing information defined in a manufacturing cell unit associated with the manufacture of the product from the production planning apparatus via the communication device;

generating a plurality of pieces of second manufacturing information for the plurality of manufacturing machines, respectively, based on the first manufacturing information;

transmitting the plurality of pieces of second manufacturing information to the plurality of manufacturing machines, respectively, via the communication device;

receiving manufacturing machine-specific, third manufacturing information corresponding to the second manufacturing information from each of the plurality of manufacturing machines via the communication device;

generating fourth manufacturing information defined in the manufacturing cell unit, based on the third manufacturing information from each of the plurality of manufacturing machines; and outputting the fourth manufacturing information, wherein the production planning apparatus performs manufacturing-related management by handling only the first manufacturing information defined in the manufacturing cell unit without recognizing individual manufacturing machines of the plurality of manufacturing machines, and wherein the production planning apparatus handles only the first manufacturing information when the obtaining module obtains production planning information from the production planning apparatus.

* * * * *